United States Patent
Zhou et al.

(10) Patent No.: US 12,375,226 B2
(45) Date of Patent: Jul. 29, 2025

(54) BEAM FAILURE INDICATION TECHNIQUES BASED ON USER EQUIPMENT AUTONOMY CAPABILITY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/382,066

(22) Filed: Jul. 21, 2021

(65) Prior Publication Data
US 2023/0028956 A1    Jan. 26, 2023

(51) Int. Cl.
| | | |
|---|---|---|
| H04B 7/06 | (2006.01) | |
| H04L 1/20 | (2006.01) | |
| H04W 8/24 | (2009.01) | |
| H04W 28/24 | (2009.01) | |

(52) U.S. Cl.
CPC ........... H04B 7/0695 (2013.01); H04L 1/203 (2013.01); H04W 8/24 (2013.01); H04W 28/24 (2013.01)

(58) Field of Classification Search
CPC ....... H04B 7/0695; H04B 17/17; H04L 1/203; H04W 8/24; H04W 28/24
See application file for complete search history.

(56) References Cited

U.S. PATENT DOCUMENTS

| | | | |
|---|---|---|---|
| 2019/0200248 A1 | 6/2019 | Basu Mallick et al. | |
| 2020/0067674 A1 | 2/2020 | Guan et al. | |
| 2020/0100154 A1* | 3/2020 | Cirik ................. | H04W 36/0072 |
| 2020/0178331 A1* | 6/2020 | Xu .......................... | H04W 76/16 |
| 2020/0275450 A1* | 8/2020 | Lee ........................ | H04W 72/53 |
| 2020/0403731 A1* | 12/2020 | Zhang ................... | H04W 76/14 |
| 2021/0175999 A1* | 6/2021 | Kittichokechai ..... | H04L 1/0016 |
| 2021/0345134 A1 | 11/2021 | Ottersten et al. | |

(Continued)

FOREIGN PATENT DOCUMENTS

EP        3618492 A1        3/2020

OTHER PUBLICATIONS

International Search Report and Written Opinion—PCT/US2022/034488—ISA/EPO—Oct. 17, 2022.

(Continued)

Primary Examiner — Chuong M Nguyen
(74) Attorney, Agent, or Firm — Dalei Dong; Holland & Hart LLP

(57) ABSTRACT

Methods, systems, and devices for wireless communications are described for autonomous block error rate (BLER) threshold determination fur use in beam failure indication (BFI) procedures. A user equipment (UE) that is capable of autonomously determining a BLER threshold value may provide an indication of the capability to a base station. The base station may provide configuration information that enables the UE to perform autonomous BLER threshold determination, and the UE may determine the BLER threshold value based on the configuration information. The UE may determine that a BFI has occurred based on the determined BLER threshold, and thereby enhance beam failure detection procedures to provide more efficient and reliable communications.

26 Claims, 19 Drawing Sheets

(56) References Cited

U.S. PATENT DOCUMENTS

| | | | |
|---|---|---|---|
| 2021/0377877 A1* | 12/2021 | Kazmi | H04W 52/143 |
| 2022/0007217 A1* | 1/2022 | Mondal | H04W 76/18 |
| 2022/0182175 A1* | 6/2022 | Kvernvik | H04W 24/10 |
| 2022/0322122 A1* | 10/2022 | Fujimura | H04W 24/10 |
| 2022/0345284 A1* | 10/2022 | Kim | H04L 5/0098 |

OTHER PUBLICATIONS

Mediatek Inc: "Offline Summary for Remaing Issues on Beam Failure Recovery", 3GPP TSG RAN WG1 Meeting #91, R1-1721549_7 2 2 4_Summary_Bfrecovery_V8, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Dec. 1, 2017, 19 Pages, XP051370600, Section 2.2.

Nobach L., et al., "Statelet-Based Efficient and Seamless NFV State Transfer", IEEE Transactions on Network and Service Management, vol. 14, No. 4, Dec. 2017, pp. 964-977.

* cited by examiner

BEAM FAILURE INDICATION TECHNIQUES BASED ON USER EQUIPMENT AUTONOMY CAPABILITY

FIELD OF TECHNOLOGY

The following relates to wireless communications, including beam failure indication techniques based on user equipment autonomy capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs and base stations may communicate using millimeter wave (mmW) frequencies (or higher frequencies) that may experience relatively large attenuation. In order to enhance communications reliability and reduce power consumption in such systems, beamformed communications may be used in which a base station and a UE may communicate via one or more directional beams. A base station and UE may engage in a beam training procedure to establish an active beam pair for communications. Over time, channel conditions may change such that a different active beam pair may provide more reliable communications, and the UE and base station may use various beam management procedures to switch beams. Techniques that may provide more efficient beam management may be desirable to help enhance network efficiency.

SUMMARY

The described techniques relate to improved methods, systems, devices, and apparatuses that support beam failure indication techniques based on user equipment (UE) autonomy capability. In accordance with various aspects, a UE may be capable of autonomously determining a block error rate (BLER) threshold value for use in beam management, such as for determination of a beam failure instance that may be used for beam management. The UE may provide an indication of the capability for autonomous BLER threshold value determination to a base station. The base station may provide configuration information that enables the UE to perform autonomous BLER threshold determination, and the UE may determine the BLER threshold value based on the configuration information. In some cases, the capability indication may include machine learning (ML) features, processing power/capability, memory, computation resources, and the like. The base station, in some cases, may provide a range of BLER thresholds or a set of available BLER thresholds, may provide a particular algorithm or set of algorithms to be used at the UE for determining the BLER threshold, or combinations thereof. In some cases, the UE may use one or more factors for calculating the BLER threshold value, such as interference estimates, statistics of prior BLER estimates, quality of service (QoS) requirements (e.g., targets for error rate, latency, data rate, etc.), a number of available beams, or any combinations thereof. The UE may determine that a beam failure instance has occurred based on the determined BLER threshold, and thereby enhance beam failure detection procedures to provide more efficient and reliable communications.

A method for wireless communication at a user equipment (UE) is described. The method may include transmitting, to a base station, UE capability information that indicates an available level of UE autonomy for determination of a block error rate threshold value associated with a beam failure, receiving, from the base station, control signaling that indicates a first autonomy level from the available level of UE autonomy for the determination of the block error rate threshold value at the UE, determining the block error rate threshold value based on the first autonomy level at the UE, and determining whether a beam failure instance is detected based on the determined block error rate threshold value and an estimated block error rate for communications with the base station.

An apparatus for wireless communication at a UE is described. The apparatus may include a processor, memory coupled with the processor, and instructions stored in the memory. The instructions may be executable by the processor to cause the apparatus to transmit, to a base station, UE capability information that indicates an available level of UE autonomy for determination of a block error rate threshold value associated with a beam failure, receive, from the base station, control signaling that indicates a first autonomy level from the available level of UE autonomy for the determination of the block error rate threshold value at the UE, determine the block error rate threshold value based on the first autonomy level at the UE, and determine whether a beam failure instance is detected based on the determined block error rate threshold value and an estimated block error rate for communications with the base station.

Another apparatus for wireless communication at a UE is described. The apparatus may include means for transmitting, to a base station, UE capability information that indicates an available level of UE autonomy for determination of a block error rate threshold value associated with a beam failure, means for receiving, from the base station, control signaling that indicates a first autonomy level from the available level of UE autonomy for the determination of the block error rate threshold value at the UE, means for determining the block error rate threshold value based on the first autonomy level at the UE, and means for determining whether a beam failure instance is detected based on the determined block error rate threshold value and an estimated block error rate for communications with the base station.

A non-transitory computer-readable medium storing code for wireless communication at a UE is described. The code may include instructions executable by a processor to transmit, to a base station, UE capability information that indicates an available level of UE autonomy for determination of a block error rate threshold value associated with a beam failure, receive, from the base station, control signaling that indicates a first autonomy level from the available level of UE autonomy for the determination of the block error rate threshold value at the UE, determine the block error rate threshold value based on the first autonomy level at the UE, and determine whether a beam failure instance is detected based on the determined block error rate threshold value and an estimated block error rate for communications with the base station.

In some examples of the method, apparatuses, and non-transitory computer-readable medium described herein, the first autonomy level indicates that the UE is to determine the block error rate threshold value directly without constraints from the base station. In some examples of the method, apparatuses, and non-transitory computer-readable medium described herein, the control signaling indicates the first autonomy level and one or more of a range of available block error rate threshold values or a set of available block error rate threshold values from which the UE may select the block error rate threshold value. In some examples of the method, apparatuses, and non-transitory computer-readable medium described herein, the control signaling indicates the first autonomy level and one or more algorithms from a set of available algorithms to be used at the UE for the determining the block error rate threshold value. In some examples of the method, apparatuses, and non-transitory computer-readable medium described herein, the control signaling may be transmitted in radio resource control (RRC) signaling, in a medium access control (MAC) control element, in downlink control information (DCI), or any combinations thereof.

In some examples of the method, apparatuses, and non-transitory computer-readable medium described herein, the determining the block error rate threshold value may include operations, features, means, or instructions for selecting a block error rate threshold determination algorithm from a set of available algorithms at the UE and determining the block error rate threshold value according to the selected block error rate threshold determination algorithm. In some examples of the method, apparatuses, and non-transitory computer-readable medium described herein, the determining the block error rate threshold value may include operations, features, means, or instructions for identifying one or more factors associated with communications with the base station and determining the block error rate threshold value based on the one or more factors. In some examples of the method, apparatuses, and non-transitory computer-readable medium described herein, the one or more factors include one or more of an estimated interference associated with a channel between the UE and the base station, one or more prior block error rate estimates, one or more quality of service (QoS) targets for communications with the base station, a number of beams available for communications with the base station, or any combinations thereof. In some examples of the method, apparatuses, and non-transitory computer-readable medium described herein, the one or more QoS targets include one or more of a target packet error rate for communications with the base station, a target latency for communications with the base station, a target data rate for communications with the base station, or any combinations thereof.

In some examples of the method, apparatuses, and non-transitory computer-readable medium described herein, the UE capability information includes one or more of an available machine learning capability of the UE, a processing power of the UE, an amount of memory at the UE, an amount of UE computation resources, or any combinations thereof. Some examples of the method, apparatuses, and non-transitory computer-readable medium described herein may further include operations, features, means, or instructions for transmitting, to the base station in one or more of a medium access control (MAC) control element or uplink control information, one or more of an update to the available level of UE autonomy, an activation or deactivation request for determining the block error rate threshold value at the UE, a requested level of autonomy, or any combinations thereof.

Some examples of the method, apparatuses, and non-transitory computer-readable medium described herein may further include operations, features, means, or instructions for receiving, from the base station in one or more of a MAC control element or downlink control information, an updated level of UE autonomy, an activation or deactivation command for determining the block error rate threshold value at the UE, or any combinations thereof. In some examples of the method, apparatuses, and non-transitory computer-readable medium described herein, the UE capability information and the control signaling may be communicated using layer three (L3) signaling between the UE and the base station. In some examples of the method, apparatuses, and non-transitory computer-readable medium described herein, one or more updated parameters associated with the first autonomy level may be communicated using layer one (L1) or layer two (L2) signaling between the UE and the base station.

A method for wireless communication at a base station is described. The method may include receiving, from a UE, UE capability information that indicates an available level of UE autonomy for determination of a block error rate threshold value associated with a beam failure, determining to enable the UE to autonomously determine the block error rate threshold value based on the UE capability information, and transmitting, to the UE, control signaling that indicates a first autonomy level for the determination of the block error rate threshold value.

An apparatus for wireless communication at a base station is described. The apparatus may include a processor, memory coupled with the processor, and instructions stored in the memory. The instructions may be executable by the processor to cause the apparatus to receive, from a UE, UE capability information that indicates an available level of UE autonomy for determination of a block error rate threshold value associated with a beam failure, determine to enable the UE to autonomously determine the block error rate threshold value based on the UE capability information, and transmit, to the UE, control signaling that indicates a first autonomy level for the determination of the block error rate threshold value.

Another apparatus for wireless communication at a base station is described. The apparatus may include means for receiving, from a UE, UE capability information that indicates an available level of UE autonomy for determination of a block error rate threshold value associated with a beam failure, means for determining to enable the UE to autonomously determine the block error rate threshold value based on the UE capability information, and means for transmitting, to the UE, control signaling that indicates a first autonomy level for the determination of the block error rate threshold value.

A non-transitory computer-readable medium storing code for wireless communication at a base station is described. The code may include instructions executable by a processor to receive, from a UE, UE capability information that indicates an available level of UE autonomy for determination of a block error rate threshold value associated with a beam failure, determine to enable the UE to autonomously determine the block error rate threshold value based on the UE capability information, and transmit, to the UE, control signaling that indicates a first autonomy level for the determination of the block error rate threshold value.

In some examples of the method, apparatuses, and non-transitory computer-readable medium described herein, the first autonomy level indicates that the UE is to determine the block error rate threshold value directly without constraints from the base station. In some examples of the method, apparatuses, and non-transitory computer-readable medium described herein, the control signaling indicates the first autonomy level and one or more of a range of available block error rate threshold values or a set of available block error rate threshold values from which the UE may select the block error rate threshold value. In some examples of the method, apparatuses, and non-transitory computer-readable medium described herein, the control signaling indicates the first autonomy level and one or more algorithms from a set of available algorithms to be used at the UE for the determining the block error rate threshold value. In some examples of the method, apparatuses, and non-transitory computer-readable medium described herein, the control signaling may be transmitted in RRC signaling, in a MAC control element, in DCI, or any combinations thereof.

Some examples of the method, apparatuses, and non-transitory computer-readable medium described herein may further include operations, features, means, or instructions for identifying one or more factors associated with communications between the UE and the base station and configuring the UE to determine the block error rate threshold value based on the one or more factors. In some examples of the method, apparatuses, and non-transitory computer-readable medium described herein, the one or more factors include one or more of an estimated interference associated with a channel between the UE and the base station, one or more prior block error rate estimates, one or more QoS targets for communications between the UE and the base station, a number of beams available for communications between the UE and the base station, or any combinations thereof. In some examples of the method, apparatuses, and non-transitory computer-readable medium described herein, the one or more QoS targets include one or more of a target packet error rate for communications between the UE and the base station, a target latency for communications between the UE and the base station, a target data rate for communications between the UE and the base station, or any combinations thereof.

In some examples of the method, apparatuses, and non-transitory computer-readable medium described herein, the UE capability information includes one or more of an available machine learning capability of the UE, a processing power of the UE, an amount of memory at the UE, an amount of UE computation resources, or any combinations thereof. Some examples of the method, apparatuses, and non-transitory computer-readable medium described herein may further include operations, features, means, or instructions for receiving, from the UE in one or more of a MAC control element or uplink control information, one or more of an update to the available level of UE autonomy, an activation or deactivation request for determining the block error rate threshold value at the UE, a requested level of autonomy, or any combinations thereof. Some examples of the method, apparatuses, and non-transitory computer-readable medium described herein may further include operations, features, means, or instructions for transmitting, to the UE in one or more of a MAC control element or downlink control information, an updated level of UE autonomy, an activation or deactivation command for determining the block error rate threshold value at the UE, or any combinations thereof.

DETAILED DESCRIPTION

Figure 1:
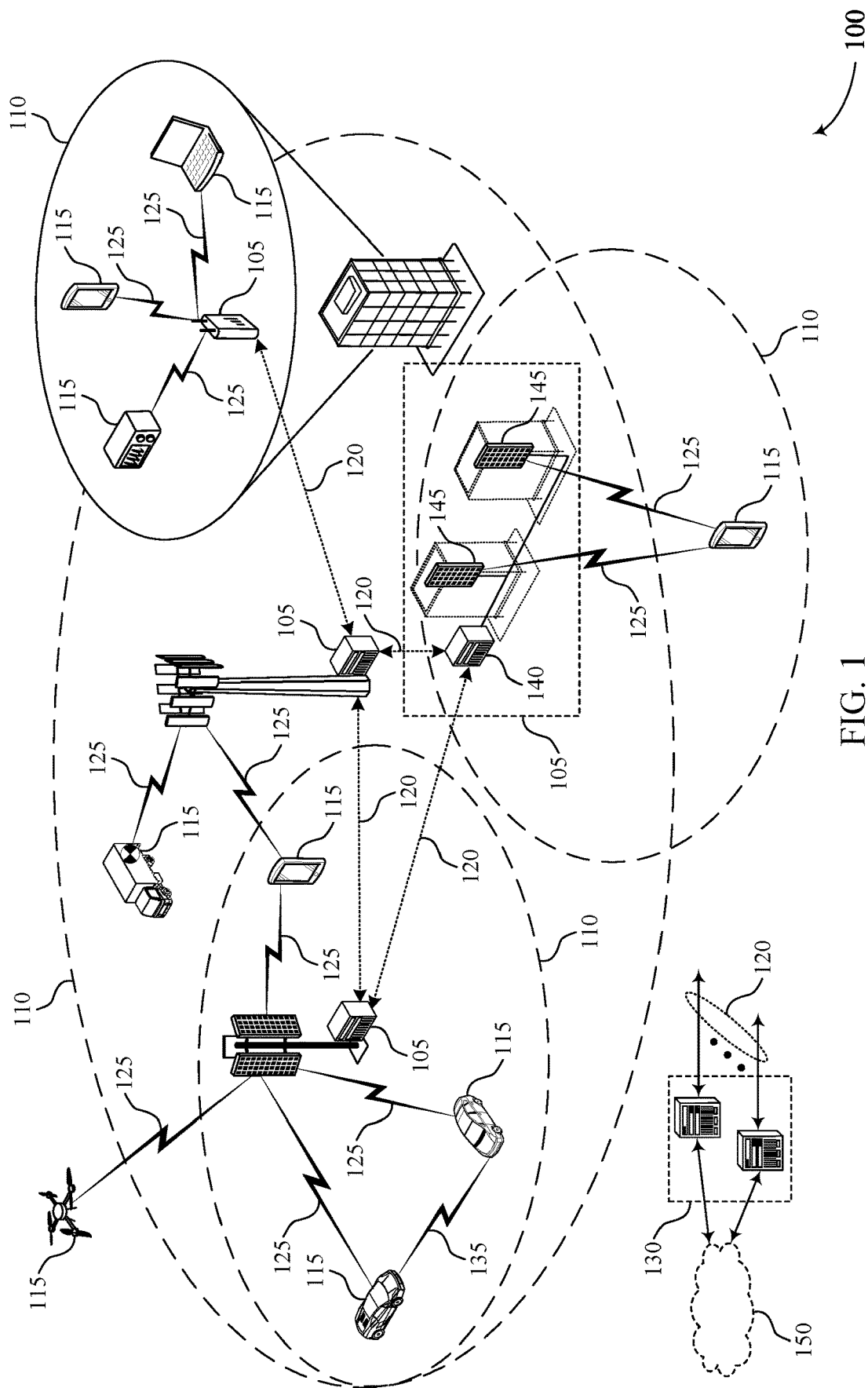
FIG. 1 illustrates an example of a wireless communications system that supports beam failure indication techniques based on user equipment (UE) autonomy capability in accordance with aspects of the present disclosure.

Various described techniques provide for autonomous determination at a user equipment (UE) of a block error rate (BLER) threshold value for use in beam management procedures. In some cases, UEs operating in high frequency bands (e.g., frequency range two (FR2) and higher) using millimeter wave (mmW) communications may use relatively narrow beams to enhance communications efficiency and reliability. Due to the highly directional nature of the beams, beam management procedures, such as beam failure detection (BFD) procedures, may be implemented to trigger changes to beams that are used for communications. The beam management procedures may initiated based on a beam failure instance or beam failure indication (BFI) that is detected by a UE. In some cases, the UE may detect a BFI based on an estimated BLER in comparison with a BLER threshold. In cases where a UE is unable to autonomously set its BLER threshold, the base station may configure the BLER threshold (e.g., 10%) at UEs. Setting the BLER threshold in such a manner may result in cases where a particular UE may over-detect BFI or under-detect BFI. For example, if temporary interference is present at a UE there may be a spike in BLER even though channel conditions are otherwise good, which may cause a BFI detection and initiate a BFD procedure to switch beams when the established beam may still be suitable for communications. In other cases, if a relatively large number of beams are available, a lower BLER threshold may provide for beam switching to a more reliable beam. Thus, the relatively static configuration of BLER thresholds by a base station may result in inefficiencies in BFD procedures.

In accordance with techniques discussed herein, a UE may use autonomous features to adjust BLER threshold values for detecting BFI based on current conditions at the UE. In some cases, the UE may transmit a capability indication to a serving base station of available UE autonomy for BLER threshold adjustment for detecting BFI. The capability indication may include machine learning (ML) features, processing power/capability, memory, computation resources, and the like. The base station, based on the UE capability, may enable autonomous BLER threshold adjustments at the UE. The base station, in some cases, may provide a range of BLER thresholds or a set of available BLER thresholds, may provide a particular algorithm or set of algorithms to be used for determining the BLER threshold, or any combinations thereof. Factors to consider for calculating the BLER threshold may include, for example, interference estimates, statistics of prior BLER estimates, quality of service (QoS) targets (e.g., targets for error rate, latency, data rate, etc.), a number of available beams, or any combinations thereof. The UE may detect a BFI based on the adjusted BLER thresholds and initiate a BFD procedure based on one or more detected BFIs, where the adjusted BLER threshold value may enhance such procedures to provide more efficient and reliable communications.

Providing such BLER threshold determination procedures may provide for more efficient and reliable beam management. For example, beam management based on autonomously determined BLER thresholds may reduce a number of beam switches in the event of temporary interference, or may trigger faster beam switches in the event that a relatively large number of beams are available that may have better channel conditions. Such techniques may thus allow for more efficient and reliable access, and thereby enhance the reliability and efficiency of the associated wireless communications network. Further, techniques as discussed herein may reduce a number of downlink and uplink transmissions, and thereby reduce power consumption at a UE, for example.

Aspects of the disclosure are initially described in the context of wireless communications systems. Aspects of the disclosure are further illustrated by and described with reference to apparatus diagrams, process flows, system diagrams, and flowcharts that relate to beam failure indication techniques based on UE autonomy capability.

FIG. 1 illustrates an example of a wireless communications system 100 that supports beam failure indication techniques based on UE autonomy capability in accordance with aspects of the present disclosure. The wireless communications system 100 may include one or more base stations 105, one or more UEs 115, and a core network 130.

In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

As discussed herein, in some cases, one or more UEs 115 may be capable of autonomously determining a BLER threshold value for use in beam management, such as for determination of a BFI that may be used for beam management. In some cases, a UE 115 may provide an indication of the capability for autonomous BLER threshold value determination to a base station 105. The base station 105 may provide configuration information that enables the UE 115 to perform autonomous BLER threshold determination, and the UE 115 may determine the BLER threshold value based on the configuration information. The UE 115 may determine that a BFI has occurred based on the determined BLER threshold, and thereby enhance beam failure detection procedures to provide more efficient and reliable communications.

Figure 2:
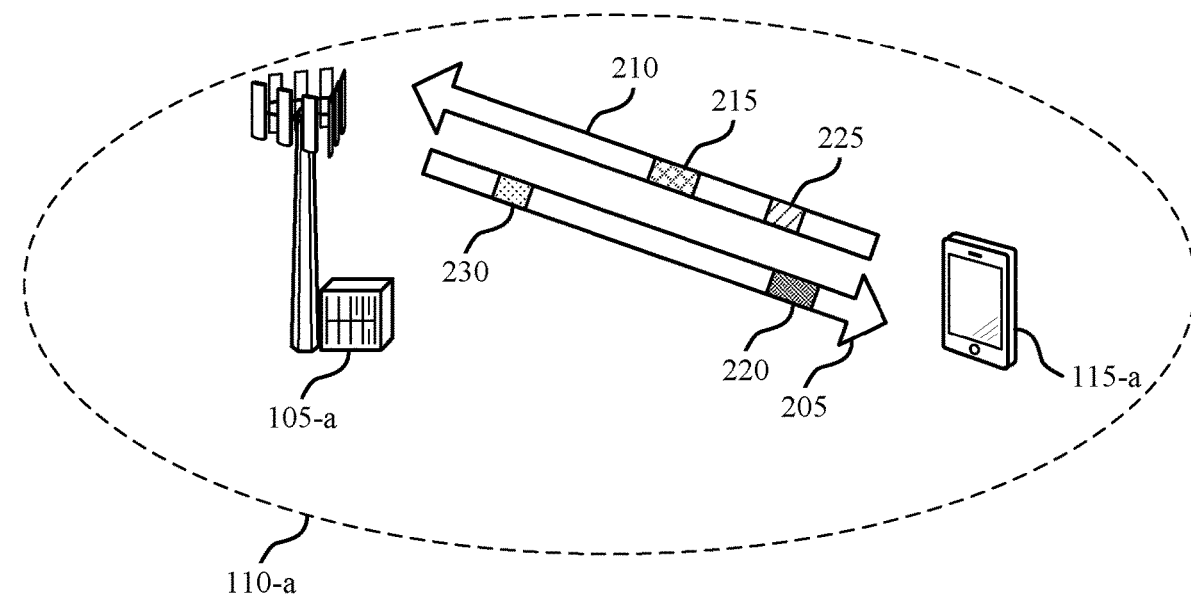
FIG. 2 illustrates an example of a portion of a wireless communications system that supports beam failure indication techniques based on UE autonomy capability in accordance with aspects of the present disclosure.

FIG. 2 illustrates an example of a wireless communications system 200 that supports beam failure indication techniques based on UE autonomy capability in accordance with aspects of the present disclosure. In some examples, wireless communications system 200 may implement aspects of wireless communications system 100. Wireless communications system 200 may include a base station 105-a and a UE 115-a, which may be examples of the corresponding devices described with reference to FIG. 1. Base station 105-a and UE 115-a may communicate using one or more directional beams. In wireless communications system 200, a transmitter (e.g., base station 105-a) may engage in a beam sweeping operation to establish an active beam pair link with a receiver (e.g., UE 115-a) that may be used for downlink communications 205 and uplink communications 210.

In some cases, the UE 115-a may transmit a UE capability indication 215 to the base station 105-a. In some cases, the UE capability indication 215 may provide an autonomy capability related to autonomous BLER threshold determination that can be performed at the UE 115-a. The base station 105-a may receive the UE capability indication 215, and determine a configuration for the UE 115-a. In some cases, the base station 105-a may determine to enable UE 115-a autonomy for setting BLER threshold values for BFI, in accordance with aspects of the present disclosure. The base station 105-a may transmit configuration information 220 to the UE 115-a that indicates an autonomy level for BLER threshold determination at the UE 115-a. The UE 115-a may determine a BLER threshold value in accordance with the configured autonomy level, and may perform beam management based on the determined BLER threshold value. In some cases, based on a number of BFIs, other channel metrics, or any combinations thereof, the UE 115-a may transmit a beam failure declaration 225 to the base station 105-a. Such a beam failure declaration 225 may trigger a beam switch procedure at the UE 115-a and base station 105-a to switch communications to a different beam. In other cases, the UE 115-a may transmit some other type of beam switch request or indication. While various examples discussed herein discuss beam failure declarations, BLER threshold value adjustment techniques as discussed herein may be used in any number of beam management procedures or other procedures related to management of communications between the UE 115-a and base station 105-a. In some cases, based on the beam failure declaration 225, the base station 105-a may transmit control information 230 to the UE 115-a that may relate to a beam switch procedure, for example.

Autonomous BLER threshold determination techniques as discussed herein may allow for enhanced beam management that is based on particular conditions that are present at the UE 115-a. Compared to existing techniques in which the base station 105-a controls all of the aspects of BFD processes (e.g., the base station 105-a configures BFD reference signals, BFI determination criteria, etc.), autonomous adjustment of BLER thresholds at the UE 115-a (e.g., based on one or more configured algorithms, machine learning at the UE 115-a, or both) may improve BFD reaction time and reduce UE 115-a processing delay (e.g., there is no need to wait for the base station 105-a instruction to transmit a BFD), thus providing potential faster reaction to beam failure events, reduced reliance on base station 105-a resources, reduced controlling overhead, and the like.

In cases where BFD may be based on BFIs detected based on estimated BLER, the base station 105-a may transmit a reference signal (e.g., a periodic BFD reference signal such as a synchronization signal block (SSB) or channel state information reference signal (CSI-RS)), and the UE 115-*a* may measure the reference signal and estimate a BLER. A trigger condition for a BFI may be that the estimated BLER is greater than the BLER threshold, and thus adjustments to the BLER threshold may impact BFI sensitivity, and thus BLER threshold adjustments may be adjusted based on one or more factors to provide for BFIs that are tuned to experienced conditions at the UE 115-*a*.

In some cases, the base station 105-*a* may set an autonomy level at the UE 115-*a*. The autonomy level may include, for example, an autonomy level zero in which the base station 105-*a* controls everything (i.e., no UE autonomy for setting BLER thresholds). The base station 105-*a* may set autonomy to a higher level, such as autonomy level one, that may allow the UE 115-*a* to determine a BLER threshold for BFI directly without any constraints from the base station 105-*a*. In some cases, additional autonomy levels may be provided, such as the base station 105-*a* configuring the UE 115-*a* with a range of BLER thresholds (e.g., 5%-25%) or a set of BLER thresholds, and the UE 115-*a* may autonomously select the BLER threshold from the configured threshold pool. Additionally, or alternatively, the UE 115-*a* may be configured with algorithms to obtain BLER thresholds autonomously, and the base station 105-*a* may specify the algorithm or a set of algorithms and the UE 115-*a* may autonomously select from the set of algorithms (e.g., machine learning algorithms). In some cases, RRC configuration may be used to configure the UE 115-*a*, and downlink control information (DCI) or a medium access control (MAC) control element (CE) may be used to indicate an algorithm (or BLER threshold set) switch.

In some cases, the UE capability indication 215 may indicate various UE 115-*a* attributes, such as machine learning features or capability, a processing power, a processing capacity, an amount of memory at the UE 115-*a*, computation resources, or any combinations thereof. In some cases, subsequent to an initial capability indication, the UE 115-*a* may signal an update or requested change to the base station 105-*a*. For example, the UE 115-*a* may transmit a MAC-CE or UCI communication that indicates a requested autonomy level, an autonomy activation/deactivation request, or combinations thereof. The base station 105-*a* may activate or deactivate an autonomy level of the UE 115-*a* based on the reported capability and any requests (e.g., via a MAC-CE or DCI communication).

In some cases, the base station 105-*a* may configure the BLER threshold calculation algorithms together with the associated parameters (e.g., available beams thresholds, data rate thresholds, etc.) via RRC configuration (e.g., level three (L3) signaling). In some cases, the UE 115-*a* may be equipped with BLER threshold calculation algorithms, and the base station 105-*a* may indicate which algorithm is to be used. In some cases, multiple sets of parameters may be configured, and the base station 105-*a* may switch which set of parameters is to be used, such as via a MAC CE or DCI (e.g., L1/L2 signaling).

Figure 3:
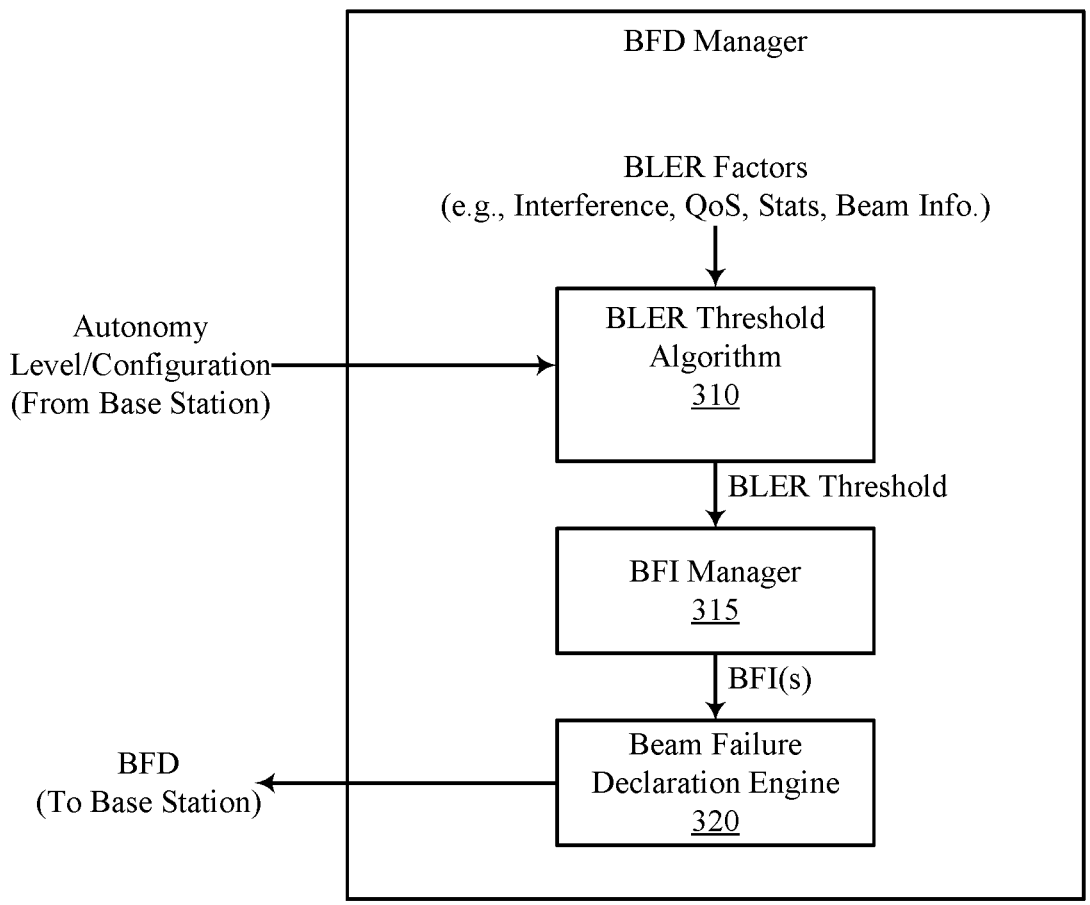
FIG. 3 illustrates a block diagram of a BFD manager that supports beam failure indication techniques based on UE autonomy capability in accordance with aspects of the present disclosure.

FIG. 3 illustrates an example of a BFD manager 300 that supports beam failure indication techniques based on UE autonomy capability in accordance with aspects of the present disclosure. In some examples, BFD manager 300 may be implemented in a UE (e.g., a UE 115 of FIG. 1 or 2). In this example, one or multiple BLER factors, such as an interference level (e.g., a measured interference level based on one or more reference signal measurements), QoS targets, historical statistics, beam information, and the like, may be provided to a BLER threshold algorithm 310. In some cases, the BLER algorithm 310 may use machine learning to determine BLER threshold values based on historical BLER factors and associated BFDs, radio link failures, acknowledgment/negative-acknowledgment (ACK/NACK) indications, and the like. In other cases, the UE may be configured with a number of different BLER threshold algorithms 310, and the UE may select the algorithm or receive signaling from a serving base station may indicate which algorithm to use. The signaling from the base station, in some cases, may include an autonomy level and related configuration, which may be provided to the BLER threshold algorithm 310.

The BLER threshold algorithm 310 may output a BLER threshold value, that may be provided to a BFI manager 315. The BFI manager 315 may compare the BLER threshold value with an estimated BLER that is based on one or more measurements from one or more reference signals (e.g., BFD-RS measurements, CSI-RS measurements, SSB measurements). Based on the comparison, the BFI manager 315 may output one or more BFIs to a beam failure detection engine 320, which may generate a BFD that is transmitted to the serving base station in the event that it is determined to declare a beam failure and trigger a beam switch.

In some cases, the one or multiple BLER factors may include an interference factor, and when interference is high but the channel condition is otherwise good (e.g., indicating temporary interference of obstruction of a beam), the BLER threshold may be changed to be a larger value in order to avoid triggering a BFD before confirming the interference is sustained. Such an adjustment to the BLER threshold may help reduce the impact of temporary interference and BFI declaration may be reduced. In cases where statistics from historical BLER estimates are used as a factor in the algorithm, a BLER threshold database may be used to adjust the BLER threshold value. In cases where QoS targets are used as a factor in the algorithm, the UE may use one or more of a target packet error rate (e.g., if the target error rate is low the BLER threshold may be set to be lower, and if the target error rate is high the BLER threshold may be set to be higher), a latency target (e.g., if the target latency is low the BLER threshold may be set lower, and if the target latency is high the BLER threshold may be set to be higher), a target data rate (e.g., if the target data rate is low the BLER threshold may be set higher, and if the target data rate is high the BLER threshold may be set to be lower), or any combinations thereof. In cases where the number of available beams are used as a factor in the algorithm, the UE may set a lower BLER threshold if the number of available beams is greater than a threshold number of beams, and may set a higher BLER threshold if the number of available beams is less than or equal to the threshold number of beams (e.g., delay BFI in the event of fewer available beams). Such techniques may allow a UE to set the BLER threshold value based on current conditions, and thereby enhance efficiency and reliability of communications.

Figure 4:
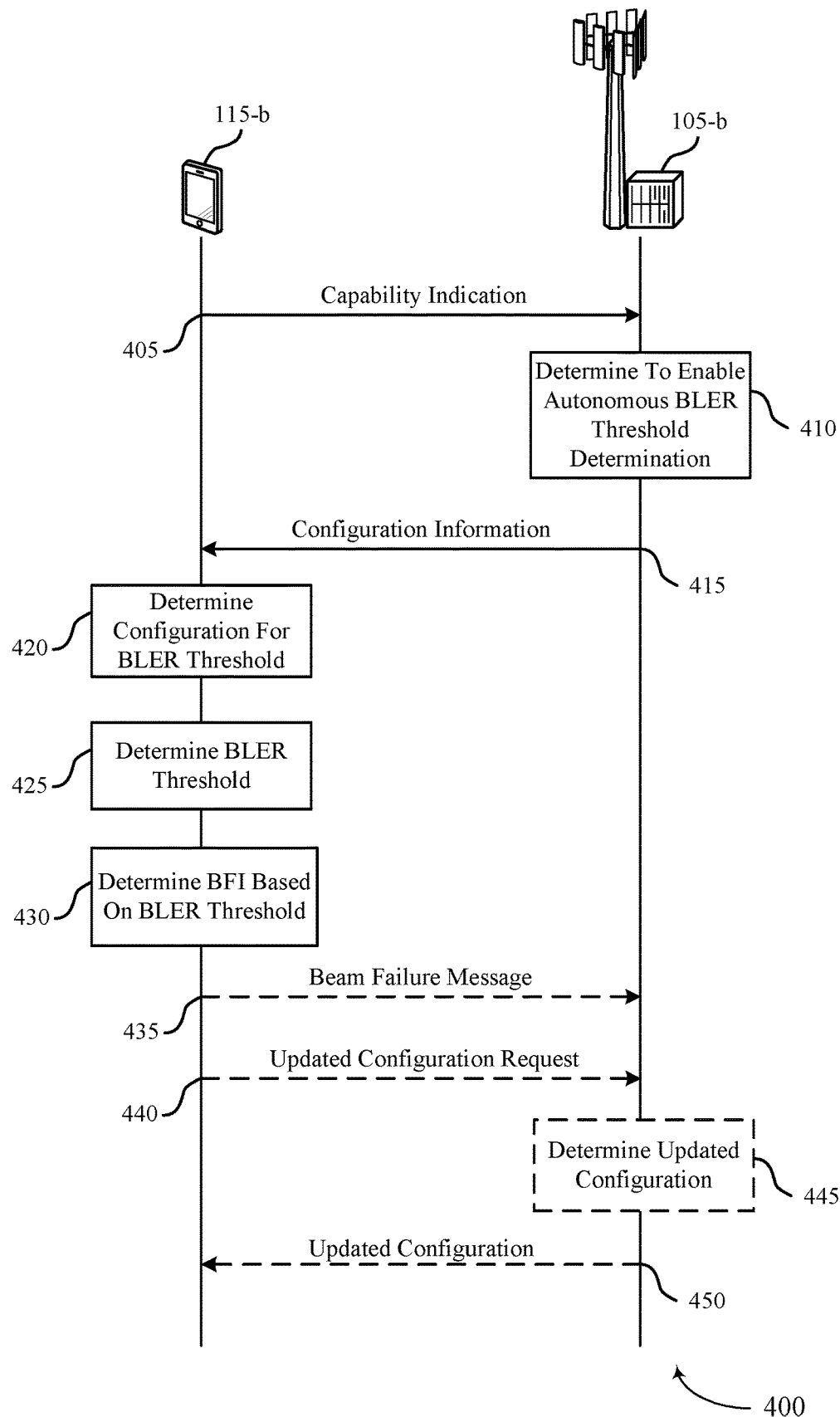
FIG. 4 illustrates an example of a process flow that supports beam failure indication techniques based on UE autonomy capability in accordance with aspects of the present disclosure.

FIG. 4 illustrates an example of a process flow 400 that supports beam failure indication techniques based on UE autonomy capability in accordance with aspects of the present disclosure. In some examples, process flow 400 may implement aspects of wireless communications system 100 or 200. Process flow 400 may be implemented by UE 115-*b* and base station 105-*b*, as described herein. Alternative examples of the following may be implemented, where some steps are performed in a different order than described or are not performed at all. In some cases, steps may include additional features not mentioned below, or further steps may be added.

At 405, the UE **115-*b* may transmit a capability indication to the base station 105-*b*. In some cases, the capability indication may indicate that the UE 115-*b*** has a capability to autonomously determine BLER threshold values. In some cases, the capability indication may indicate a level of capability, such as a BLER threshold algorithm or set of algorithms that are available, a processing capability, a machine learning capability, memory resources, and the like.

At 410, the base station **105-*b* may determine to enable autonomous BLER threshold determination at the UE 115-*b*. In some cases, the determination may be made based on the capability of the UE 115-*b*, current channel conditions, an amount of available resources of the base station 105-*b* (e.g., higher autonomy may be enabled if the base station 105-*b* has constrained resources), data levels or congestion (e.g., higher autonomy may be configured when congestion is higher to allow for reduced signaling related to BFI aspects of beam management), among other factors. At 415, the base station 105-*b* may transmit configuration information to the UE 115-*b*. In some cases, the configuration information may indicate a level of autonomy, a range of BLER thresholds that are permitted, a set of available BLER threshold values, one or more algorithms that are to be used at the UE 115-*b***, or any combinations thereof.

At 420, the UE **115-*b* may determine the configuration for BLER threshold determination. In cases where autonomous BLER threshold determination is configured, the determination may include which algorithm(s) may be used, factors to use for the determination, and the like. At 425, the UE 115-*b* may determine the BLER threshold. For example, the UE 115-*b*** may use a BLER threshold algorithm such as discussed herein to determine a BLER threshold value.

At 430, the UE **115-*b* may determine a BFI based on the determined BLER threshold. The determination of BFI may be made based on an estimated BLER (e.g., based on one or more reference signal measurements, such as an estimated BLER based on a particular level of reference signal received power (RSRP) or signal to noise ratio (SNR)) as compared to the determined BLER threshold value. At 435, in the event that BFD criteria are met, the UE 115-*b* may transmit a beam failure message (e.g., a beam failure recovery request (BFRQ) or a random access request) to the base station 105-*b***, which may trigger a beam switch procedure.

Optionally, at 440, the UE **115-*b* may transmit an updated configuration request to the base station 105-*b*. For example, the UE 115-*b* may determine that a different BLER autonomy level or algorithm may be preferred (e.g., based on a number of BFIs being detected in relatively good channel conditions), and may request a change to the BLER autonomy configuration. In such cases, at 445, the base station 105-*b* may determine an updated configuration and, at 450, may transmit the updated configuration to the UE 115-*b***. Thus, the BLER autonomy configuration may be updated to a new configuration if such an update would be useful, such as in the case of changing channel conditions in which a different BLER threshold or algorithm would be useful.

Figure 5:
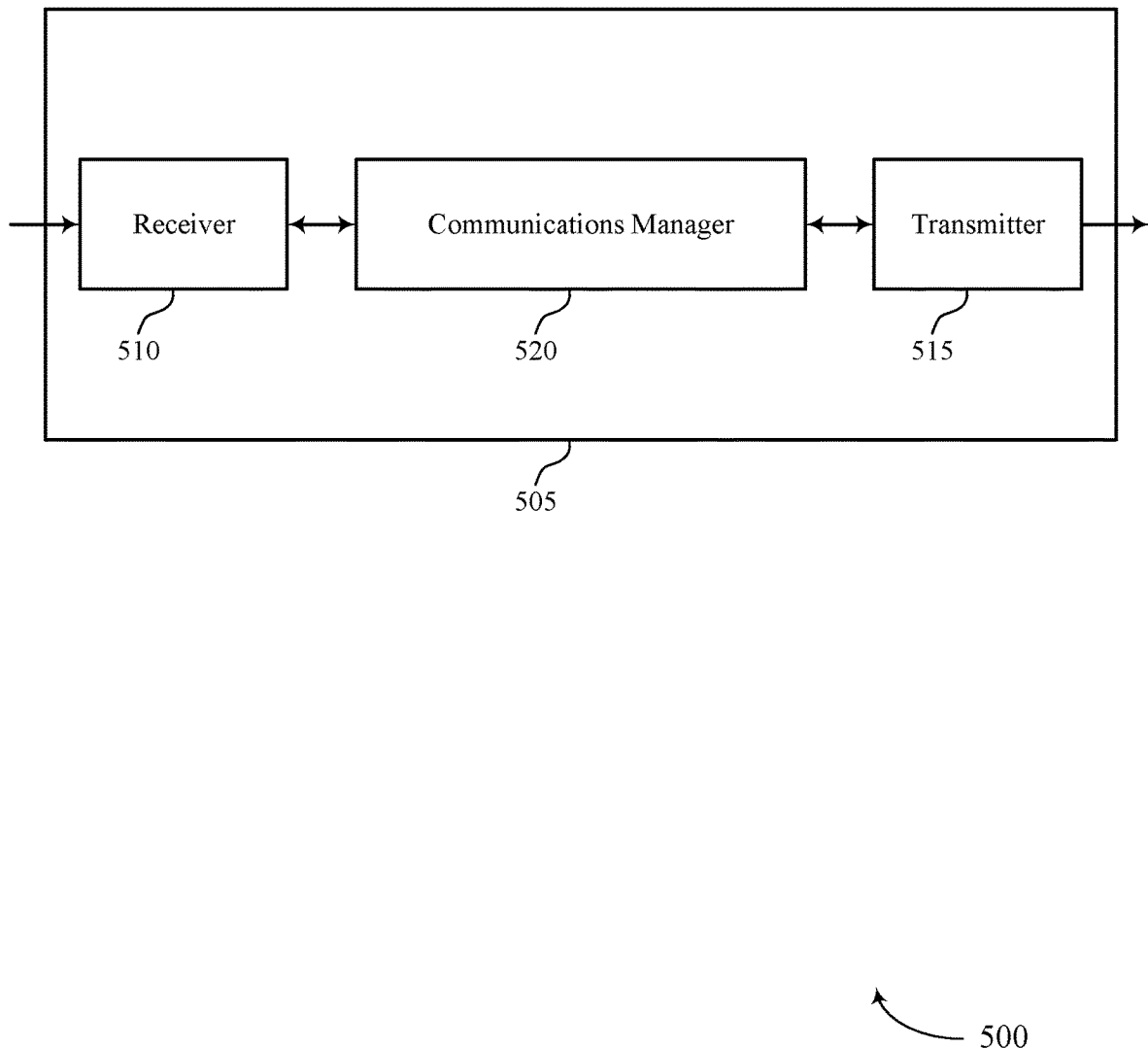
FIGS. 5 and 6 show block diagrams of devices that support beam failure indication techniques based on UE autonomy capability in accordance with aspects of the present disclosure.

FIG. 5 shows a block diagram 500 of a device 505 that supports beam failure indication techniques based on UE autonomy capability in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam failure indication techniques based on UE autonomy capability). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam failure indication techniques based on UE autonomy capability). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of beam failure indication techniques based on UE autonomy capability as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for transmitting, to a base station, UE capability information that indicates an available level of UE autonomy for determination of a BLER threshold value associated with a beam failure. The communications manager 520 may be configured as or otherwise support a means for receiving, from the base station, control signaling that indicates a first autonomy level from the available level of UE autonomy for the determination of the BLER threshold value at the UE. The communications manager 520 may be configured as or otherwise support a means for determining the BLER threshold value based on the first autonomy level at the UE. The communications manager 520 may be configured as or otherwise support a means for determining whether a beam failure instance is detected based on the determined BLER threshold value and an estimated BLER for communications with the base station.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for BLER threshold determinations that may provide for more efficient and reliable beam management, and may, for example, reduce a number of beam switches in the event of temporary interference, or may trigger faster beam switches in the event that a relatively large number of beams are available that may have better channel conditions. Such techniques may thus allow for more efficient and reliable access, and thereby enhance the reliability and efficiency of wireless communications.

Figure 6:
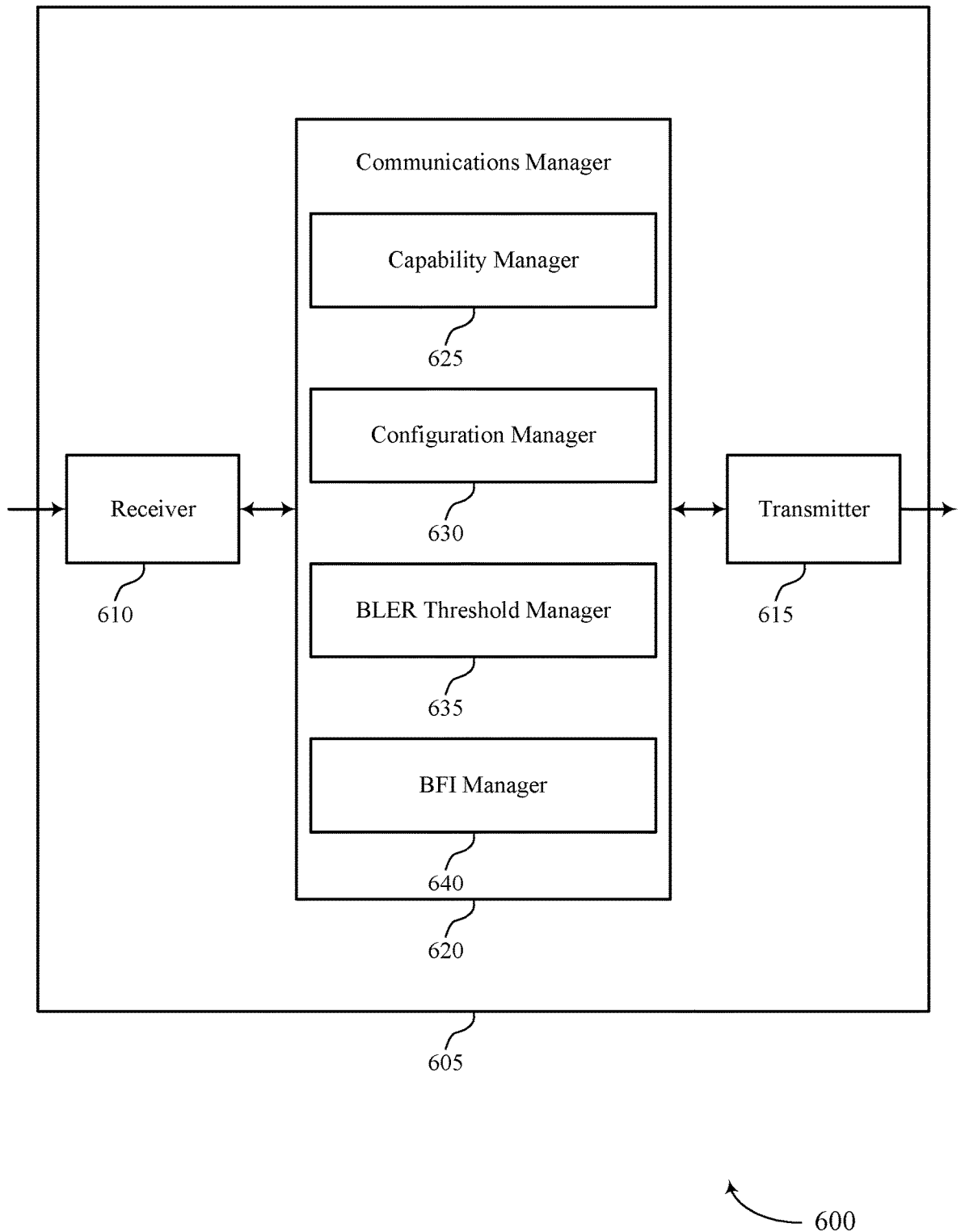

FIG. 6 shows a block diagram 600 of a device 605 that supports beam failure indication techniques based on UE autonomy capability in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam failure indication techniques based on UE autonomy capability). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam failure indication techniques based on UE autonomy capability). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of beam failure indication techniques based on UE autonomy capability as described herein. For example, the communications manager 620 may include a capability manager 625, a configuration manager 630, a BLER threshold manager 635, a BFI manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The capability manager 625 may be configured as or otherwise support a means for transmitting, to a base station, UE capability information that indicates an available level of UE autonomy for determination of a BLER threshold value associated with a beam failure. The configuration manager 630 may be configured as or otherwise support a means for receiving, from the base station, control signaling that indicates a first autonomy level from the available level of UE autonomy for the determination of the BLER threshold value at the UE. The BLER threshold manager 635 may be configured as or otherwise support a means for determining the BLER threshold value based on the first autonomy level at the UE. The BFI manager 640 may be configured as or otherwise support a means for determining whether a beam failure instance is detected based on the determined BLER threshold value and an estimated BLER for communications with the base station.

Figure 7:
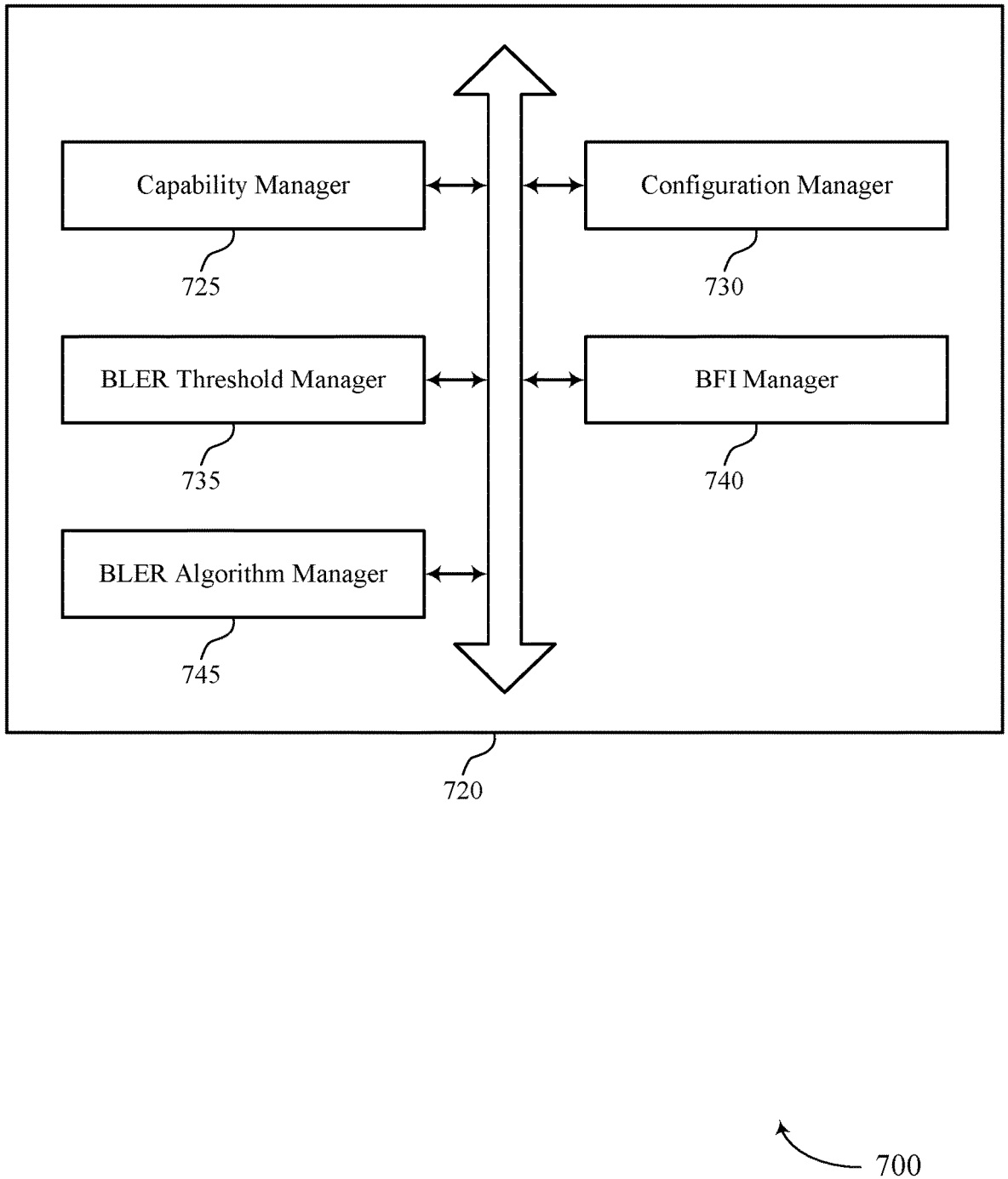
FIG. 7 shows a block diagram of a communications manager that supports beam failure indication techniques based on UE autonomy capability in accordance with aspects of the present disclosure.

FIG. 7 shows a block diagram 700 of a communications manager 720 that supports beam failure indication techniques based on UE autonomy capability in accordance with aspects of the present disclosure. The communications manager 720 may be an example of aspects of a communications manager 520, a communications manager 620, or both, as described herein. The communications manager 720, or various components thereof, may be an example of means for performing various aspects of beam failure indication techniques based on UE autonomy capability as described herein. For example, the communications manager 720 may include a capability manager 725, a configuration manager 730, a BLER threshold manager 735, a BFI manager 740, a BLER algorithm manager 745, or any combination thereof. Each of these components may communicate, directly or indirectly, with one another (e.g., via one or more buses).

The communications manager 720 may support wireless communication at a UE in accordance with examples as disclosed herein. The capability manager 725 may be configured as or otherwise support a means for transmitting, to a base station, UE capability information that indicates an available level of UE autonomy for determination of a BLER threshold value associated with a beam failure. The configuration manager 730 may be configured as or otherwise support a means for receiving, from the base station, control signaling that indicates a first autonomy level from the available level of UE autonomy for the determination of the BLER threshold value at the UE. The BLER threshold manager 735 may be configured as or otherwise support a means for determining the BLER threshold value based on the first autonomy level at the UE. The BFI manager 740 may be configured as or otherwise support a means for determining whether a beam failure instance is detected based on the determined BLER threshold value and an estimated BLER for communications with the base station.

In some examples, the first autonomy level indicates that the UE is to determine the BLER threshold value directly without constraints from the base station. In some examples, the control signaling indicates the first autonomy level and one or more of a range of available BLER threshold values or a set of available BLER threshold values from which the UE may select the BLER threshold value. In some examples, the control signaling indicates the first autonomy level and one or more algorithms from a set of available algorithms to be used at the UE for the determining the BLER threshold value. In some examples, the control signaling is transmitted in RRC signaling, in a MAC-CE, in DCI, or any combinations thereof.

In some examples, to support determining the BLER threshold value, the BLER algorithm manager 745 may be configured as or otherwise support a means for selecting a BLER threshold determination algorithm from a set of available algorithms at the UE. In some examples, to support determining the BLER threshold value, the BLER threshold manager 735 may be configured as or otherwise support a means for determining the BLER threshold value according to the selected BLER threshold determination algorithm.

In some examples, to support determining the BLER threshold value, the BLER threshold manager 735 may be configured as or otherwise support a means for identifying one or more factors associated with communications with the base station. In some examples, to support determining the BLER threshold value, the BLER threshold manager 735 may be configured as or otherwise support a means for determining the BLER threshold value based on the one or more factors. In some examples, the one or more factors include one or more of an estimated interference associated with a channel between the UE and the base station, one or more prior BLER estimates, one or more QoS targets for communications with the base station, a number of beams available for communications with the base station, or any combinations thereof. In some examples, the one or more QoS targets include one or more of a target packet error rate for communications with the base station, a target latency for communications with the base station, a target data rate for communications with the base station, or any combinations thereof. In some examples, the UE capability information includes one or more of an available machine learning capability of the UE, a processing power of the UE, an amount of memory at the UE, an amount of UE computation resources, or any combinations thereof.

In some examples, the configuration manager 730 may be configured as or otherwise support a means for transmitting, to the base station in one or more of a MAC-CE or UCI, one or more of an update to the available level of UE autonomy, an activation or deactivation request for determining the BLER threshold value at the UE, a requested level of autonomy, or any combinations thereof. In some examples, the configuration manager 730 may be configured as or otherwise support a means for receiving, from the base station in one or more of a MAC-CE or DCI, an updated level of UE autonomy, an activation or deactivation command for determining the BLER threshold value at the UE, or any combinations thereof. In some examples, the UE capability information and the control signaling are communicated using layer three (L3) signaling between the UE and the base station. In some examples, one or more updated parameters associated with the first autonomy level are communicated using layer one (L1) or layer two (L2) signaling between the UE and the base station.

Figure 8:
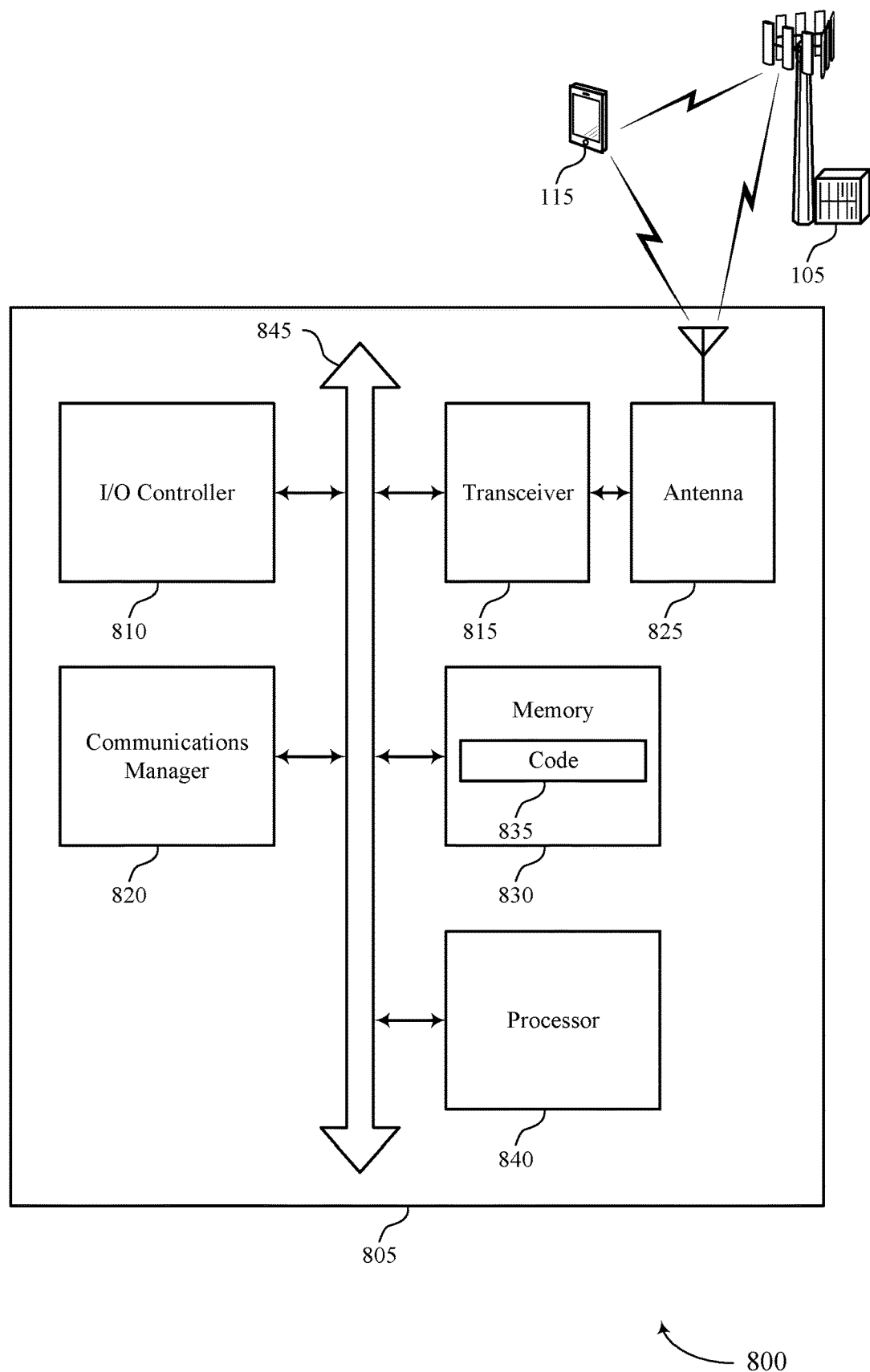
FIG. 8 shows a diagram of a system including a device that supports beam failure indication techniques based on UE autonomy capability in accordance with aspects of the present disclosure.

FIG. 8 shows a diagram of a system 800 including a device 805 that supports beam failure indication techniques based on UE autonomy capability in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beam failure indication techniques based on UE autonomy capability). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting, to a base station, UE capability information that indicates an available level of UE autonomy for determination of a BLER threshold value associated with a beam failure. The communications manager 820 may be configured as or otherwise support a means for receiving, from the base station, control signaling that indicates a first autonomy level from the available level of UE autonomy for the determination of the BLER threshold value at the UE. The communications manager 820 may be configured as or otherwise support a means for determining the BLER threshold value based on the first autonomy level at the UE. The communications manager 820 may be configured as or otherwise support a means for determining whether a beam failure instance is detected based on the determined BLER threshold value and an estimated BLER for communications with the base station.

By including or configuring the communications manager 820 in accordance with examples as described herein, the device 805 may support techniques for BLER threshold determinations that may provide for more efficient and reliable beam management, and may, for example, reduce a number of beam switches in the event of temporary interference, or may trigger faster beam switches in the event that a relatively large number of beams are available that may have better channel conditions. Such techniques may thus allow for more efficient and reliable access, and thereby enhance the reliability and efficiency of wireless communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of beam failure indication techniques based on UE autonomy capability as described herein, or the processor 840 and the memory 830 may be otherwise configured to perform or support such operations.

Figure 9:
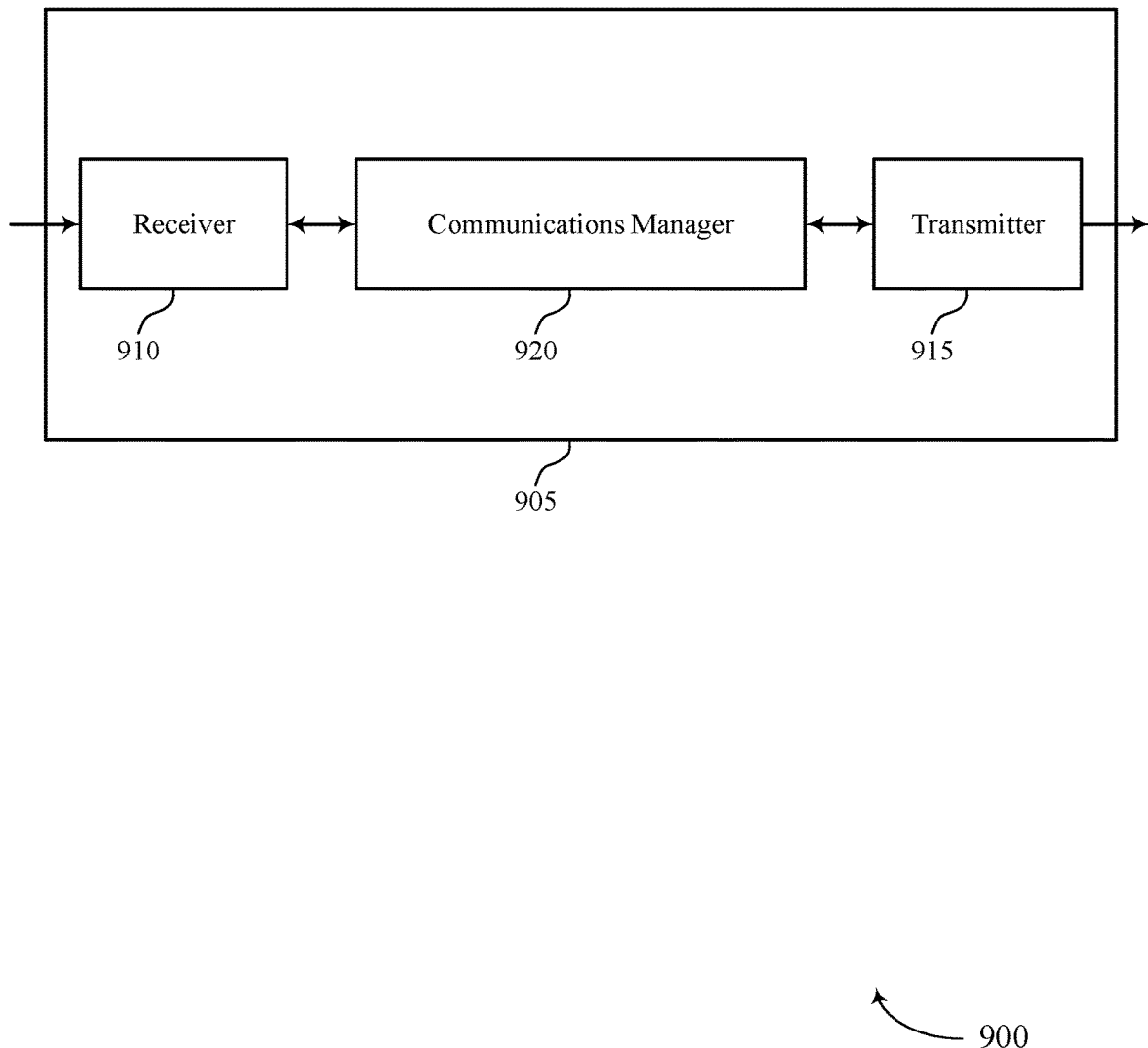
FIGS. 9 and 10 show block diagrams of devices that support beam failure indication techniques based on UE autonomy capability in accordance with aspects of the present disclosure.

FIG. 9 shows a block diagram 900 of a device 905 that supports beam failure indication techniques based on UE autonomy capability in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to beam failure indication techniques based on UE autonomy capability). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to beam failure indication techniques based on UE autonomy capability). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of beam failure indication techniques based on UE autonomy capability as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a UE, UE capability information that indicates an available level of UE autonomy for determination of a BLER threshold value associated with a beam failure. The communications manager 920 may be configured as or otherwise support a means for determining to enable the UE to autonomously determine the BLER threshold value based on the UE capability information. The communications manager 920 may be configured as or otherwise support a means for transmitting, to the UE, control signaling that indicates a first autonomy level for the determination of the BLER threshold value.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for BLER threshold determinations that may provide for more efficient and reliable beam management, and may, for example, reduce a number of beam switches in the event of temporary interference, or may trigger faster beam switches in the event that a relatively large number of beams are available that may have better channel conditions. Such techniques may thus allow for more efficient and reliable access, and thereby enhance the reliability and efficiency of wireless communications.

Figure 10:
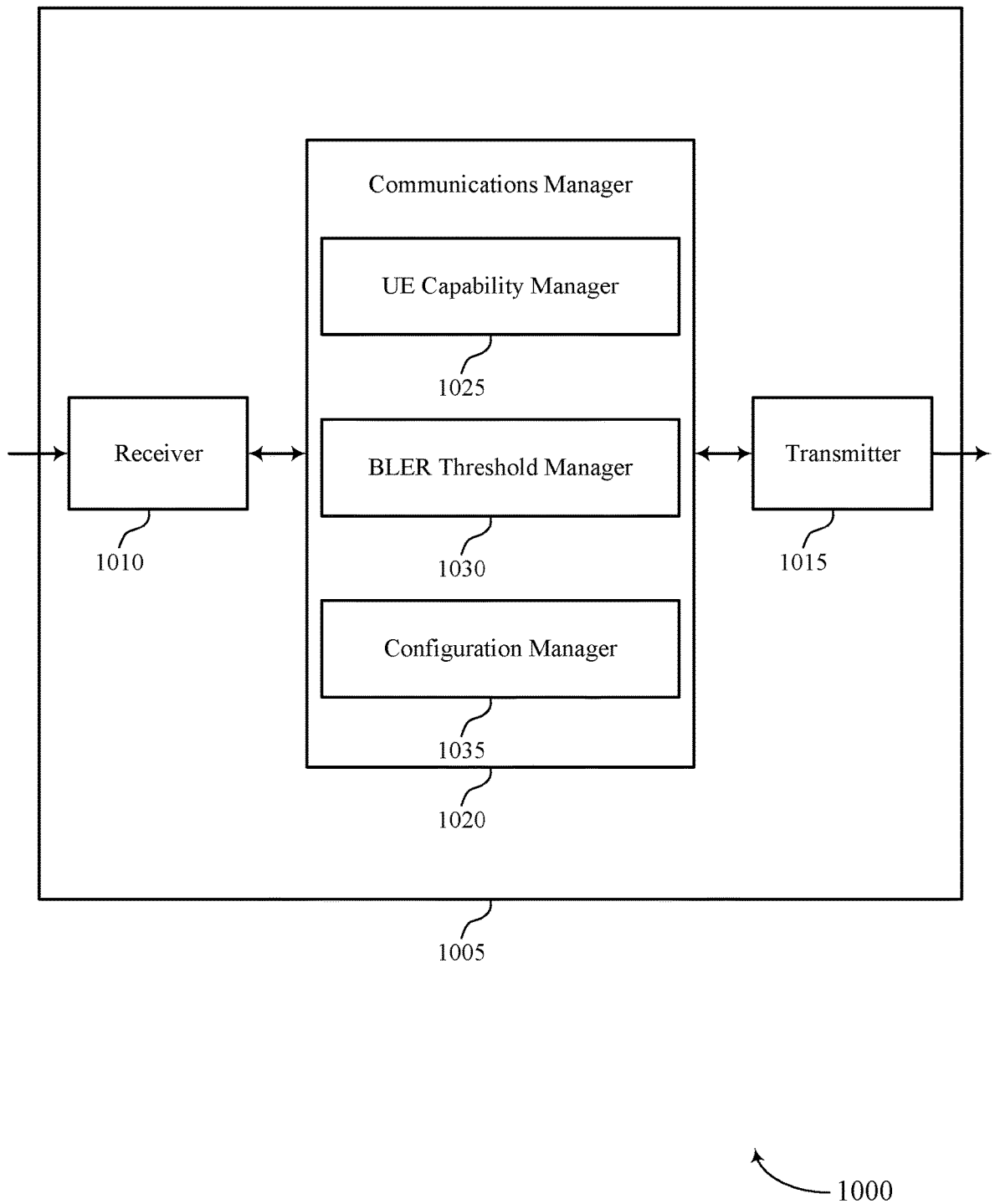

FIG. 10 shows a block diagram 1000 of a device 1005 that supports beam failure indication techniques based on UE autonomy capability in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beam failure indication techniques based on UE autonomy capability). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beam failure indication techniques based on UE autonomy capability). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of beam failure indication techniques based on UE autonomy capability as described herein. For example, the communications manager 1020 may include a UE capability manager 1025, a BLER threshold manager 1030, a configuration manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The UE capability manager 1025 may be configured as or otherwise support a means for receiving, from a UE, UE capability information that indicates an available level of UE autonomy for determination of a BLER threshold value associated with a beam failure. The BLER threshold manager 1030 may be configured as or otherwise support a means for determining to enable the UE to autonomously determine the BLER threshold value based on the UE capability information. The configuration manager 1035 may be configured as or otherwise support a means for transmitting, to the UE, control signaling that indicates a first autonomy level for the determination of the BLER threshold value.

Figure 11:
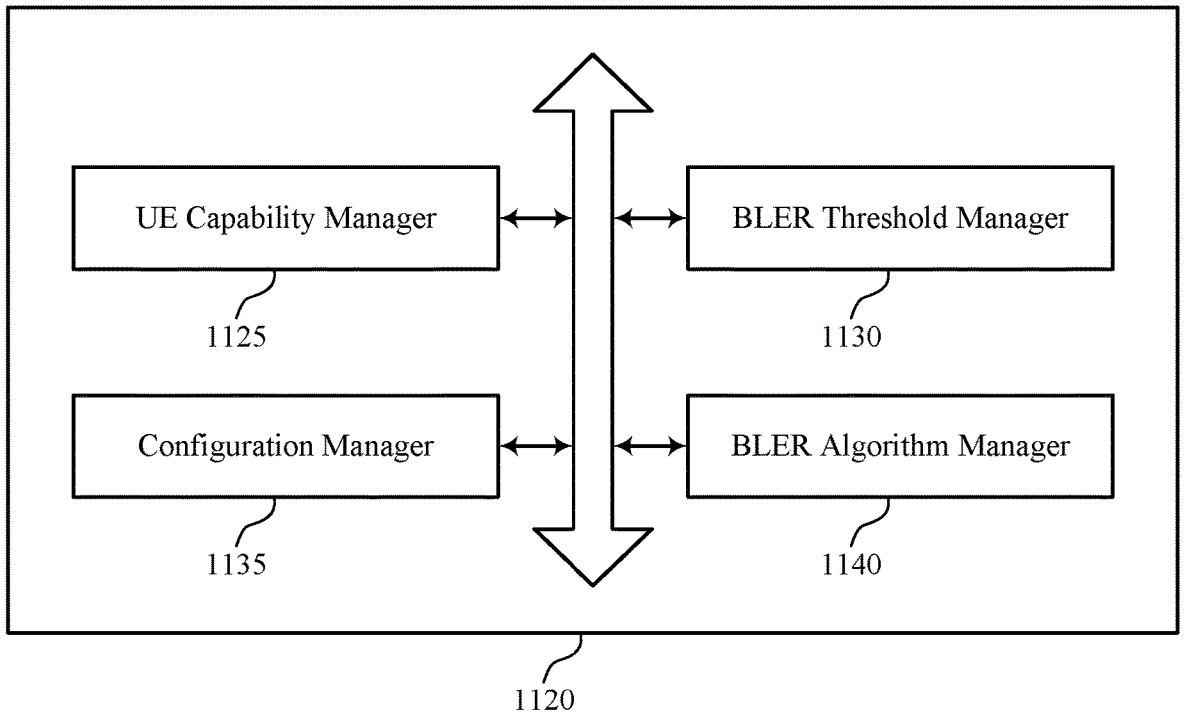
FIG. 11 shows a block diagram of a communications manager that supports beam failure indication techniques based on UE autonomy capability in accordance with aspects of the present disclosure.

FIG. 11 shows a block diagram 1100 of a communications manager 1120 that supports beam failure indication techniques based on UE autonomy capability in accordance with aspects of the present disclosure. The communications manager 1120 may be an example of aspects of a communications manager 920, a communications manager 1020, or both, as described herein. The communications manager 1120, or various components thereof, may be an example of means for performing various aspects of beam failure indication techniques based on UE autonomy capability as described herein. For example, the communications manager 1120 may include a UE capability manager 1125, a BLER threshold manager 1130, a configuration manager 1135, a BLER algorithm manager 1140, or any combination thereof. Each of these components may communicate, directly or indirectly, with one another (e.g., via one or more buses).

The communications manager 1120 may support wireless communication at a base station in accordance with examples as disclosed herein. The UE capability manager 1125 may be configured as or otherwise support a means for receiving, from a UE, UE capability information that indicates an available level of UE autonomy for determination of a BLER threshold value associated with a beam failure. The BLER threshold manager 1130 may be configured as or otherwise support a means for determining to enable the UE to autonomously determine the BLER threshold value based on the UE capability information. The configuration manager 1135 may be configured as or otherwise support a means for transmitting, to the UE, control signaling that indicates a first autonomy level for the determination of the BLER threshold value.

In some examples, the first autonomy level indicates that the UE is to determine the BLER threshold value directly without constraints from the base station. In some examples, the control signaling indicates the first autonomy level and one or more of a range of available BLER threshold values or a set of available BLER threshold values from which the UE may select the BLER threshold value. In some examples, the control signaling indicates the first autonomy level and one or more algorithms from a set of available algorithms to be used at the UE for the determining the BLER threshold value. In some examples, the control signaling is transmitted in RRC signaling, in a MAC-CE, in DCI, or any combinations thereof.

In some examples, the BLER threshold manager 1130 may be configured as or otherwise support a means for identifying one or more factors associated with communications between the UE and the base station. In some examples, the BLER threshold manager 1130 may be configured as or otherwise support a means for configuring the UE to determine the BLER threshold value based on the one or more factors. In some examples, the one or more factors include one or more of an estimated interference associated with a channel between the UE and the base station, one or more prior BLER estimates, one or more QoS targets for communications between the UE and the base station, a number of beams available for communications between the UE and the base station, or any combinations thereof. In some examples, the one or more QoS targets include one or more of a target packet error rate for communications between the UE and the base station, a target latency for communications between the UE and the base station, a target data rate for communications between the UE and the base station, or any combinations thereof. In some examples, the UE capability information includes one or more of an available machine learning capability of the UE, a processing power of the UE, an amount of memory at the UE, an amount of UE computation resources, or any combinations thereof.

In some examples, the UE capability manager 1125 may be configured as or otherwise support a means for receiving, from the UE in one or more of a medium access control (MAC) control element or uplink control information, one or more of an update to the available level of UE autonomy, an activation or deactivation request for determining the BLER threshold value at the UE, a requested level of autonomy, or any combinations thereof. In some examples, the configuration manager 1135 may be configured as or otherwise support a means for transmitting, to the UE in one or more of a MAC control element or downlink control information, an updated level of UE autonomy, an activation or deactivation command for determining the BLER threshold value at the UE, or any combinations thereof.

Figure 12:
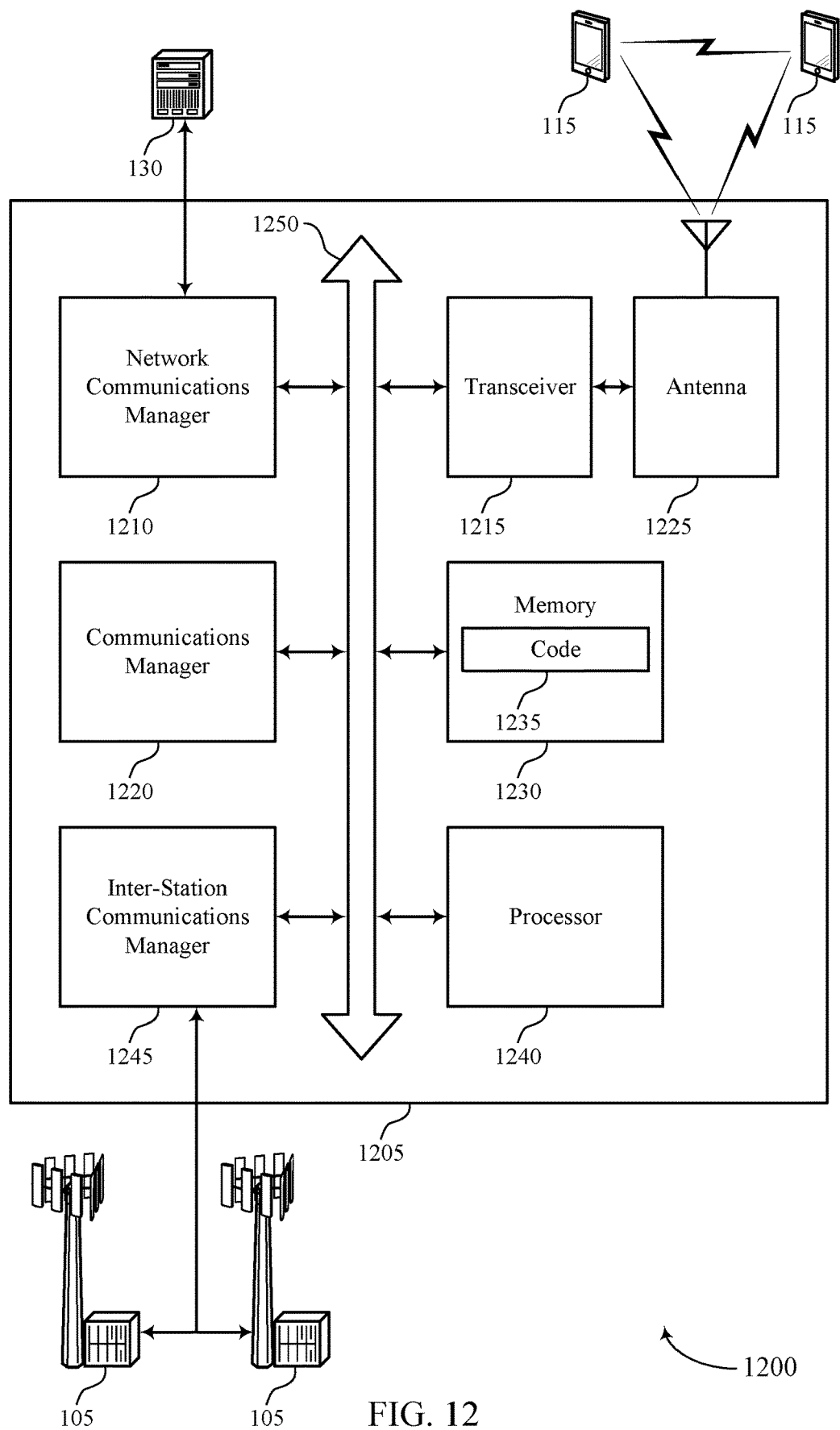
FIG. 12 shows a diagram of a system including a device that supports beam failure indication techniques based on UE autonomy capability in accordance with aspects of the present disclosure.

FIG. 12 shows a diagram of a system 1200 including a device 1205 that supports beam failure indication techniques based on UE autonomy capability in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting beam failure indication techniques based on UE autonomy capability). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a UE, UE capability information that indicates an available level of UE autonomy for determination of a BLER threshold value associated with a beam failure. The communications manager 1220 may be configured as or otherwise support a means for determining to enable the UE to autonomously determine the BLER threshold value based on the UE capability information. The communications manager 1220 may be configured as or otherwise support a means for transmitting, to the UE, control signaling that indicates a first autonomy level for the determination of the BLER threshold value.

By including or configuring the communications manager 1220 in accordance with examples as described herein, the device 1205 may support techniques for BLER threshold determinations that may provide for more efficient and reliable beam management, and may, for example, reduce a number of beam switches in the event of temporary interference, or may trigger faster beam switches in the event that a relatively large number of beams are available that may have better channel conditions. Such techniques may thus allow for more efficient and reliable access, and thereby enhance the reliability and efficiency of wireless communications.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of beam failure indication techniques based on UE autonomy capability as described herein, or the processor 1240 and the memory 1230 may be otherwise configured to perform or support such operations.

Figure 13:
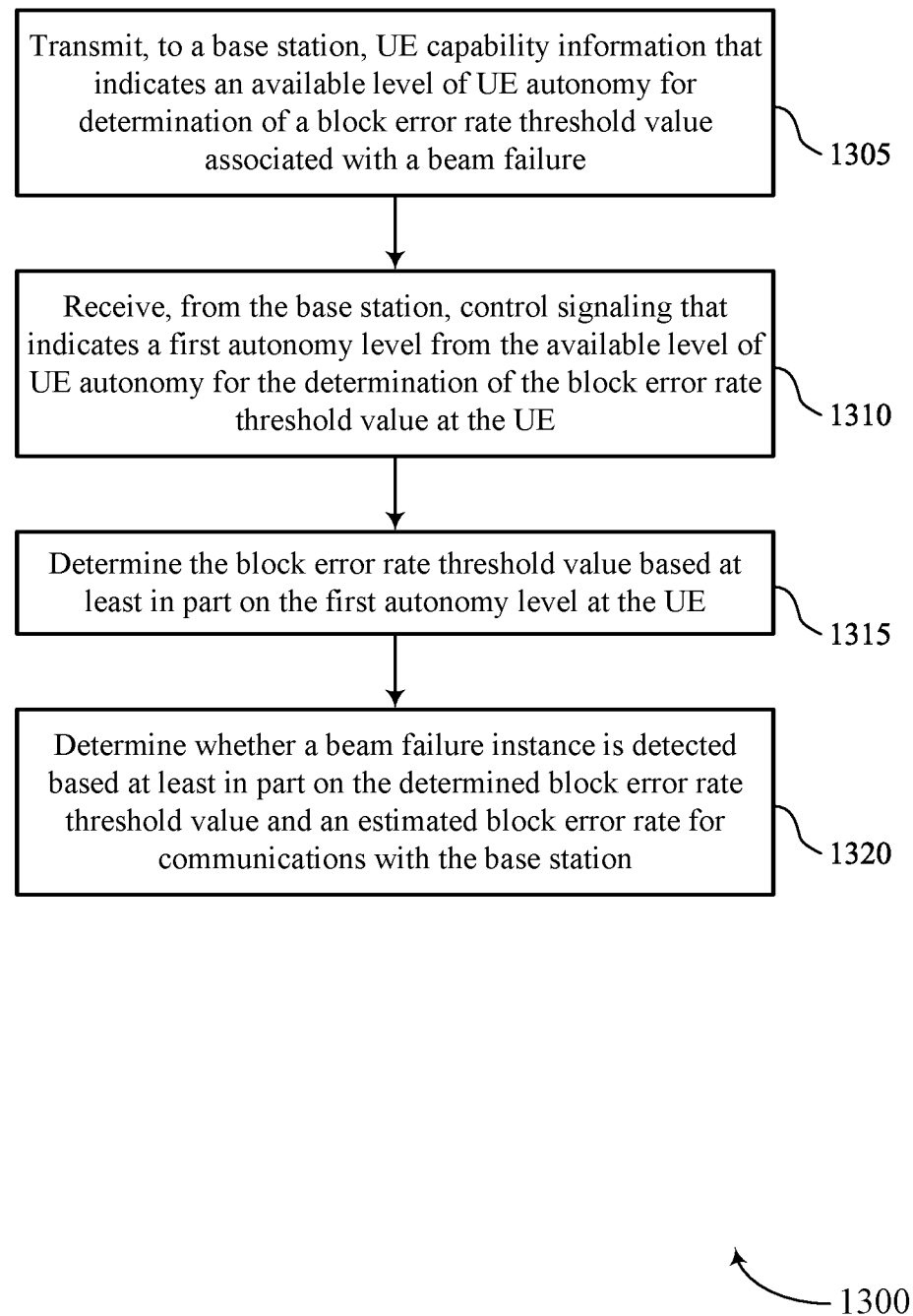
FIGS. 13 through 19 show flowcharts illustrating methods that support beam failure indication techniques based on UE autonomy capability in accordance with aspects of the present disclosure.

FIG. 13 shows a flowchart illustrating a method 1300 that supports beam failure indication techniques based on UE autonomy capability in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, UE capability information that indicates an available level of UE autonomy for determination of a BLER threshold value associated with a beam failure. The operations of 1305 may be performed in accordance with examples as disclosed herein. In some examples, aspects of the operations of 1305 may be performed by a capability manager 725 as described with reference to FIG. 7.

At 1310, the method may include receiving, from the base station, control signaling that indicates a first autonomy level from the available level of UE autonomy for the determination of the BLER threshold value at the UE. The operations of 1310 may be performed in accordance with examples as disclosed herein. In some examples, aspects of the operations of 1310 may be performed by a configuration manager 730 as described with reference to FIG. 7.

At 1315, the method may include determining the BLER threshold value based on the first autonomy level at the UE. The operations of 1315 may be performed in accordance with examples as disclosed herein. In some examples, aspects of the operations of 1315 may be performed by a BLER threshold manager 735 as described with reference to FIG. 7.

At 1320, the method may include determining whether a beam failure instance is detected based on the determined BLER threshold value and an estimated BLER for communications with the base station. The operations of 1320 may be performed in accordance with examples as disclosed herein. In some examples, aspects of the operations of 1320 may be performed by a BFI manager 740 as described with reference to FIG. 7.

Figure 14:
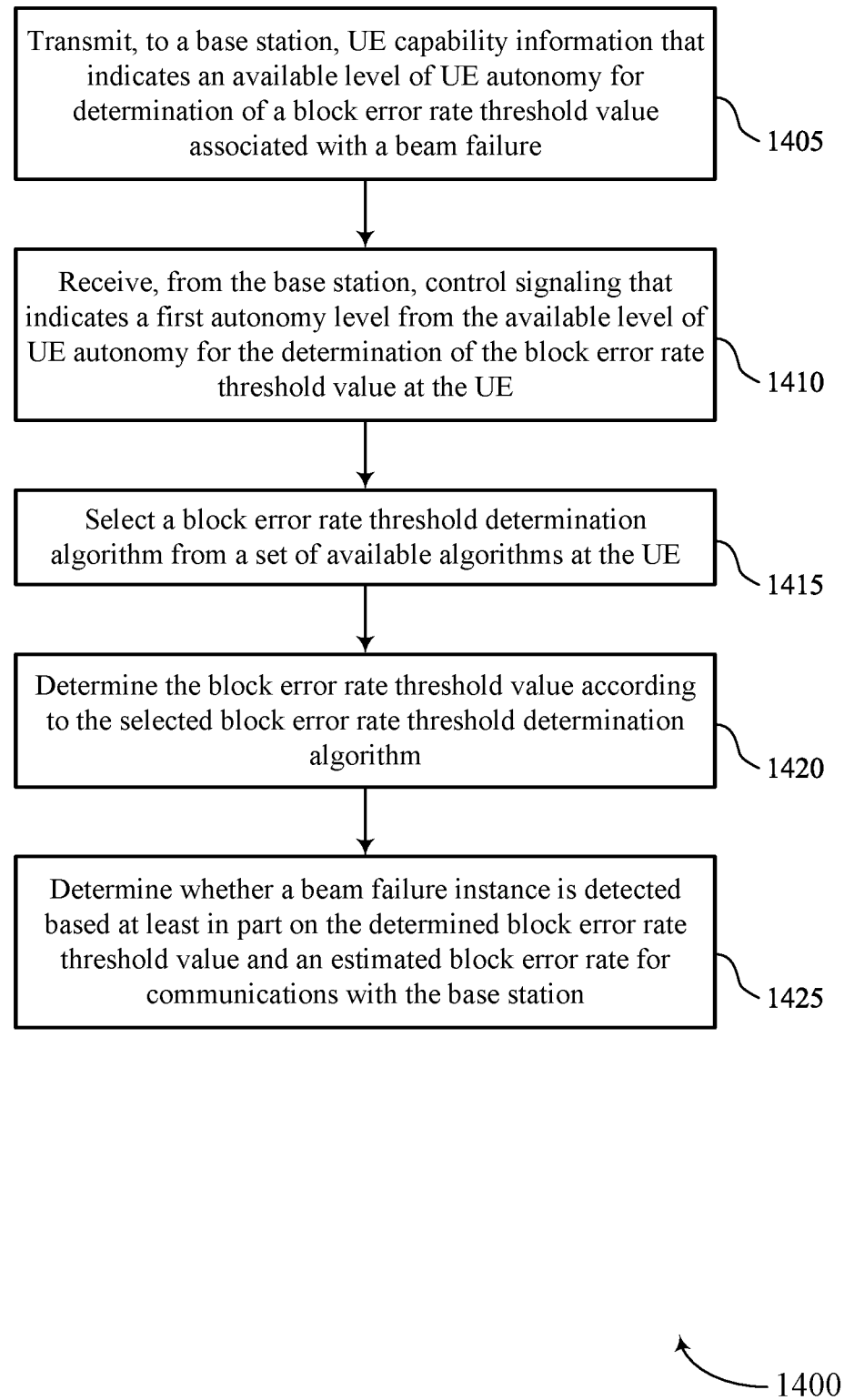

FIG. 14 shows a flowchart illustrating a method 1400 that supports beam failure indication techniques based on UE autonomy capability in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, UE capability information that indicates an available level of UE autonomy for determination of a BLER threshold value associated with a beam failure. The operations of 1405 may be performed in accordance with examples as disclosed herein. In some examples, aspects of the operations of 1405 may be performed by a capability manager 725 as described with reference to FIG. 7.

At 1410, the method may include receiving, from the base station, control signaling that indicates a first autonomy level from the available level of UE autonomy for the determination of the BLER threshold value at the UE. The operations of 1410 may be performed in accordance with examples as disclosed herein. In some examples, aspects of the operations of 1410 may be performed by a configuration manager 730 as described with reference to FIG. 7.

At 1415, the method may include selecting a BLER threshold determination algorithm from a set of available algorithms at the UE. The operations of 1415 may be performed in accordance with examples as disclosed herein. In some examples, aspects of the operations of 1415 may be performed by a BLER algorithm manager 745 as described with reference to FIG. 7.

At 1420, the method may include determining the BLER threshold value according to the selected BLER threshold determination algorithm. The operations of 1420 may be performed in accordance with examples as disclosed herein.

In some examples, aspects of the operations of 1420 may be performed by a BLER threshold manager 735 as described with reference to FIG. 7.

At 1425, the method may include determining whether a beam failure instance is detected based on the determined BLER threshold value and an estimated BLER for communications with the base station. The operations of 1425 may be performed in accordance with examples as disclosed herein. In some examples, aspects of the operations of 1425 may be performed by a BFI manager 740 as described with reference to FIG. 7.

Figure 15:
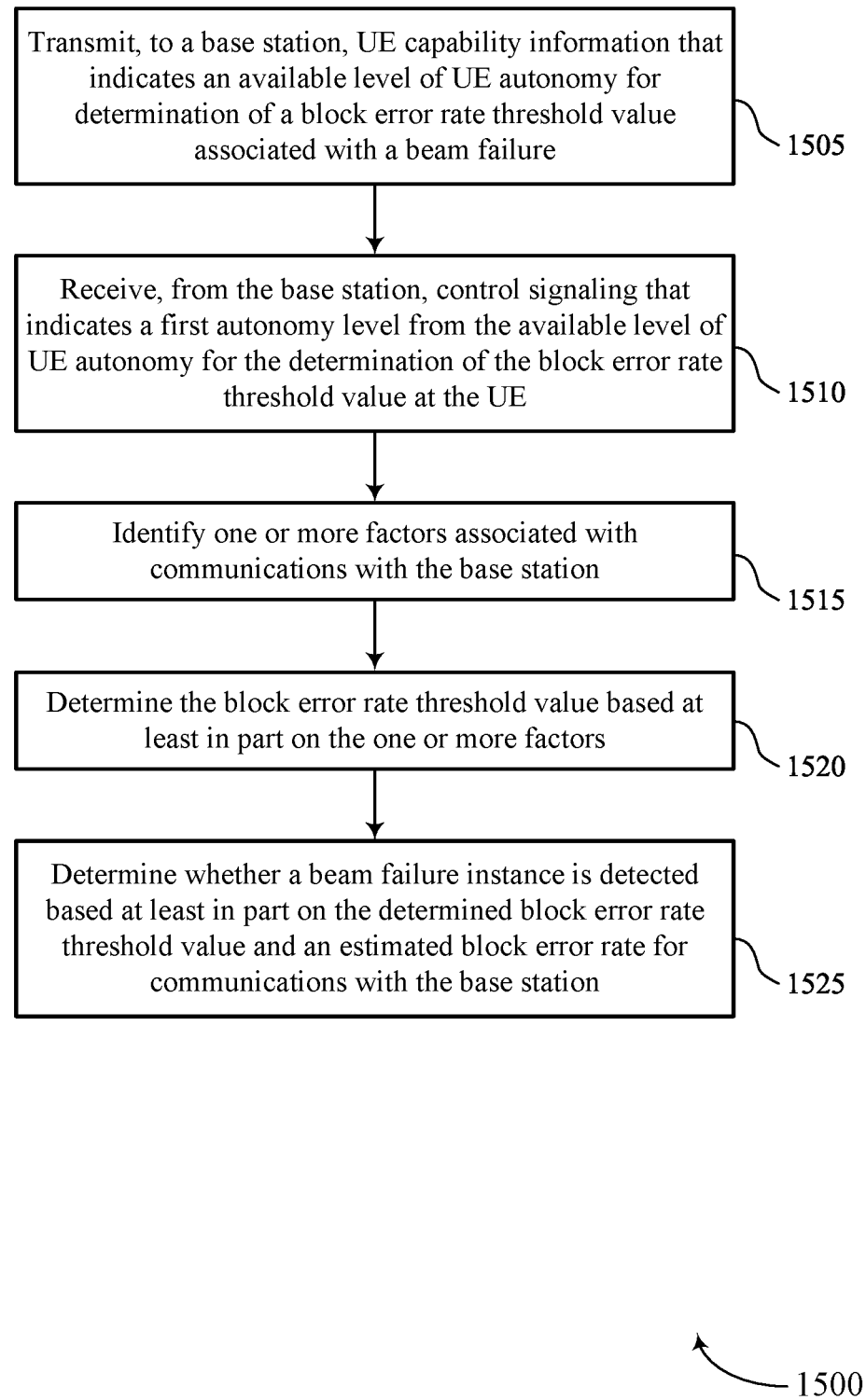

FIG. 15 shows a flowchart illustrating a method 1500 that supports beam failure indication techniques based on UE autonomy capability in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, UE capability information that indicates an available level of UE autonomy for determination of a BLER threshold value associated with a beam failure. The operations of 1505 may be performed in accordance with examples as disclosed herein. In some examples, aspects of the operations of 1505 may be performed by a capability manager 725 as described with reference to FIG. 7.

At 1510, the method may include receiving, from the base station, control signaling that indicates a first autonomy level from the available level of UE autonomy for the determination of the BLER threshold value at the UE. The operations of 1510 may be performed in accordance with examples as disclosed herein. In some examples, aspects of the operations of 1510 may be performed by a configuration manager 730 as described with reference to FIG. 7.

At 1515, the method may include identifying one or more factors associated with communications with the base station. The operations of 1515 may be performed in accordance with examples as disclosed herein. In some examples, aspects of the operations of 1515 may be performed by a BLER threshold manager 735 as described with reference to FIG. 7. In some cases, the one or more factors include one or more of an estimated interference associated with a channel between the UE and the base station, one or more prior BLER estimates, one or more QoS targets for communications with the base station, a number of beams available for communications with the base station, or any combinations thereof. In some cases, the one or more QoS targets including one or more of a target packet error rate for communications with the base station, a target latency for communications with the base station, a target data rate for communications with the base station, or any combinations thereof.

At 1520, the method may include determining the BLER threshold value based on the one or more factors. The operations of 1520 may be performed in accordance with examples as disclosed herein. In some examples, aspects of the operations of 1520 may be performed by a BLER threshold manager 735 as described with reference to FIG. 7.

At 1525, the method may include determining whether a beam failure instance is detected based on the determined BLER threshold value and an estimated BLER for communications with the base station. The operations of 1525 may be performed in accordance with examples as disclosed herein. In some examples, aspects of the operations of 1525 may be performed by a BFI manager 740 as described with reference to FIG. 7.

Figure 16:
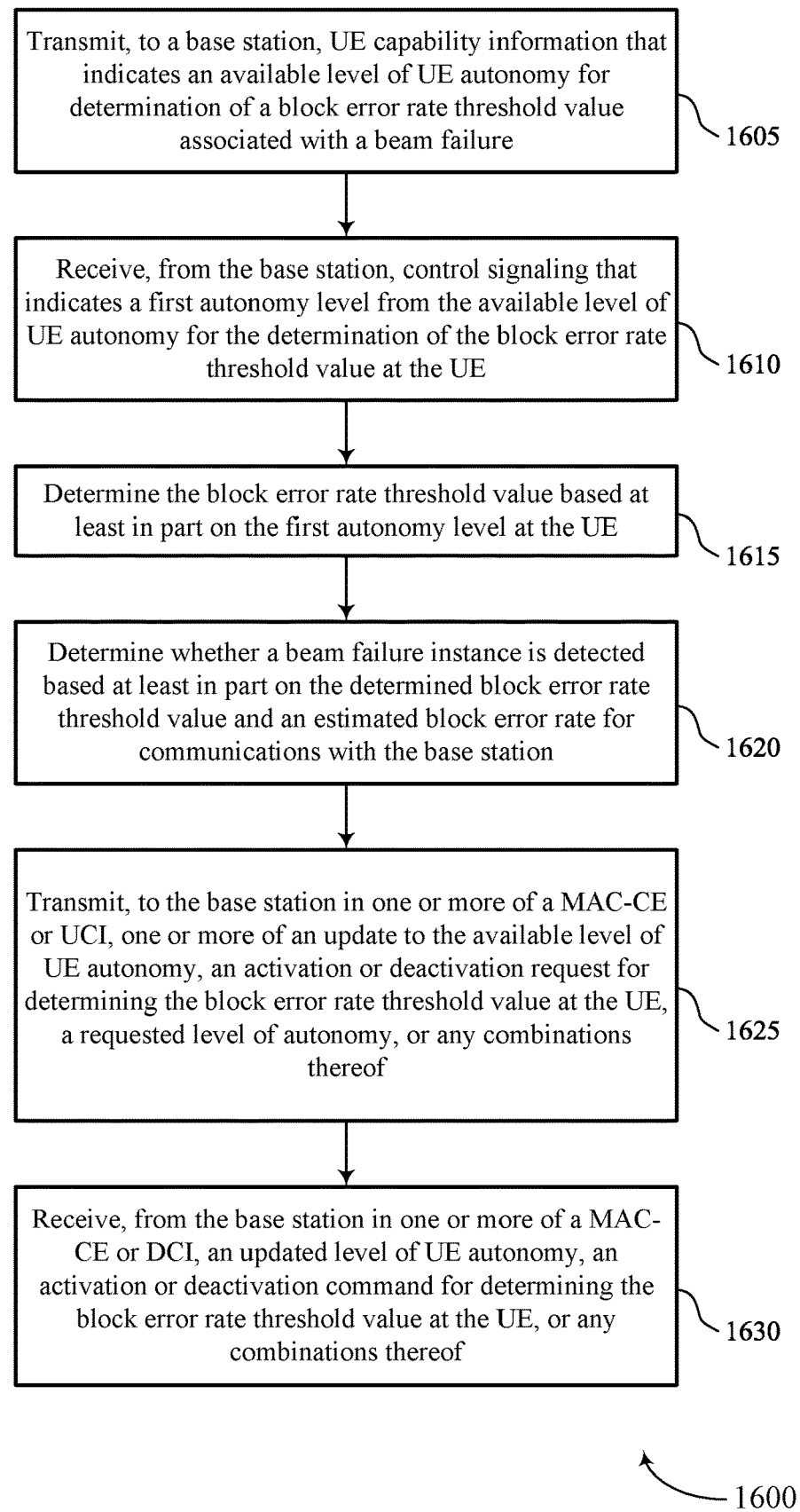

FIG. 16 shows a flowchart illustrating a method 1600 that supports beam failure indication techniques based on UE autonomy capability in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, UE capability information that indicates an available level of UE autonomy for determination of a BLER threshold value associated with a beam failure. The operations of 1605 may be performed in accordance with examples as disclosed herein. In some examples, aspects of the operations of 1605 may be performed by a capability manager 725 as described with reference to FIG. 7.

At 1610, the method may include receiving, from the base station, control signaling that indicates a first autonomy level from the available level of UE autonomy for the determination of the BLER threshold value at the UE. The operations of 1610 may be performed in accordance with examples as disclosed herein. In some examples, aspects of the operations of 1610 may be performed by a configuration manager 730 as described with reference to FIG. 7.

At 1615, the method may include determining the BLER threshold value based on the first autonomy level at the UE. The operations of 1615 may be performed in accordance with examples as disclosed herein. In some examples, aspects of the operations of 1615 may be performed by a BLER threshold manager 735 as described with reference to FIG. 7.

At 1620, the method may include determining whether a beam failure instance is detected based on the determined BLER threshold value and an estimated BLER for communications with the base station. The operations of 1620 may be performed in accordance with examples as disclosed herein. In some examples, aspects of the operations of 1620 may be performed by a BFI manager 740 as described with reference to FIG. 7.

At 1625, the method may include transmitting, to the base station in one or more of a MAC-CE or UCI, one or more of an update to the available level of UE autonomy, an activation or deactivation request for determining the BLER threshold value at the UE, a requested level of autonomy, or any combinations thereof. The operations of 1625 may be performed in accordance with examples as disclosed herein. In some examples, aspects of the operations of 1625 may be performed by a configuration manager 730 as described with reference to FIG. 7.

At 1630, the method may include receiving, from the base station in one or more of a MAC-CE or DCI, an updated level of UE autonomy, an activation or deactivation command for determining the BLER threshold value at the UE, or any combinations thereof. The operations of 1630 may be performed in accordance with examples as disclosed herein. In some examples, aspects of the operations of 1630 may be performed by a configuration manager 730 as described with reference to FIG. 7.

Figure 17:
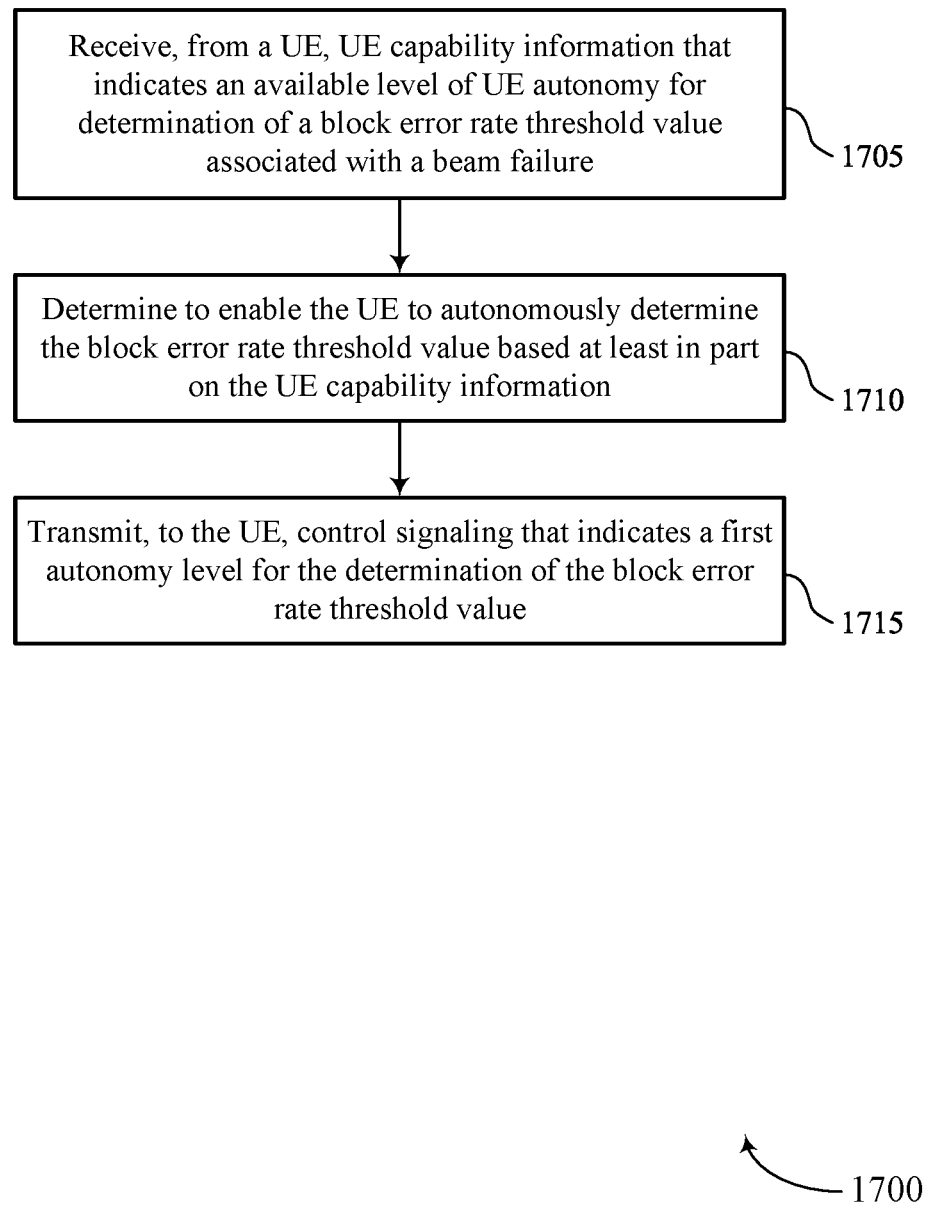

FIG. 17 shows a flowchart illustrating a method 1700 that supports beam failure indication techniques based on UE autonomy capability in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, UE capability information that indicates an available level of UE autonomy for determination of a BLER threshold value associated with a beam failure. The operations of 1705 may be performed in accordance with examples as disclosed herein. In some examples, aspects of the operations of 1705 may be performed by a UE capability manager 1125 as described with reference to FIG. 11.

At 1710, the method may include determining to enable the UE to autonomously determine the BLER threshold value based on the UE capability information. The operations of 1710 may be performed in accordance with examples as disclosed herein. In some examples, aspects of the operations of 1710 may be performed by a BLER threshold manager 1130 as described with reference to FIG. 11.

At 1715, the method may include transmitting, to the UE, control signaling that indicates a first autonomy level for the determination of the BLER threshold value. The operations of 1715 may be performed in accordance with examples as disclosed herein. In some examples, aspects of the operations of 1715 may be performed by a configuration manager 1135 as described with reference to FIG. 11.

Figure 18:
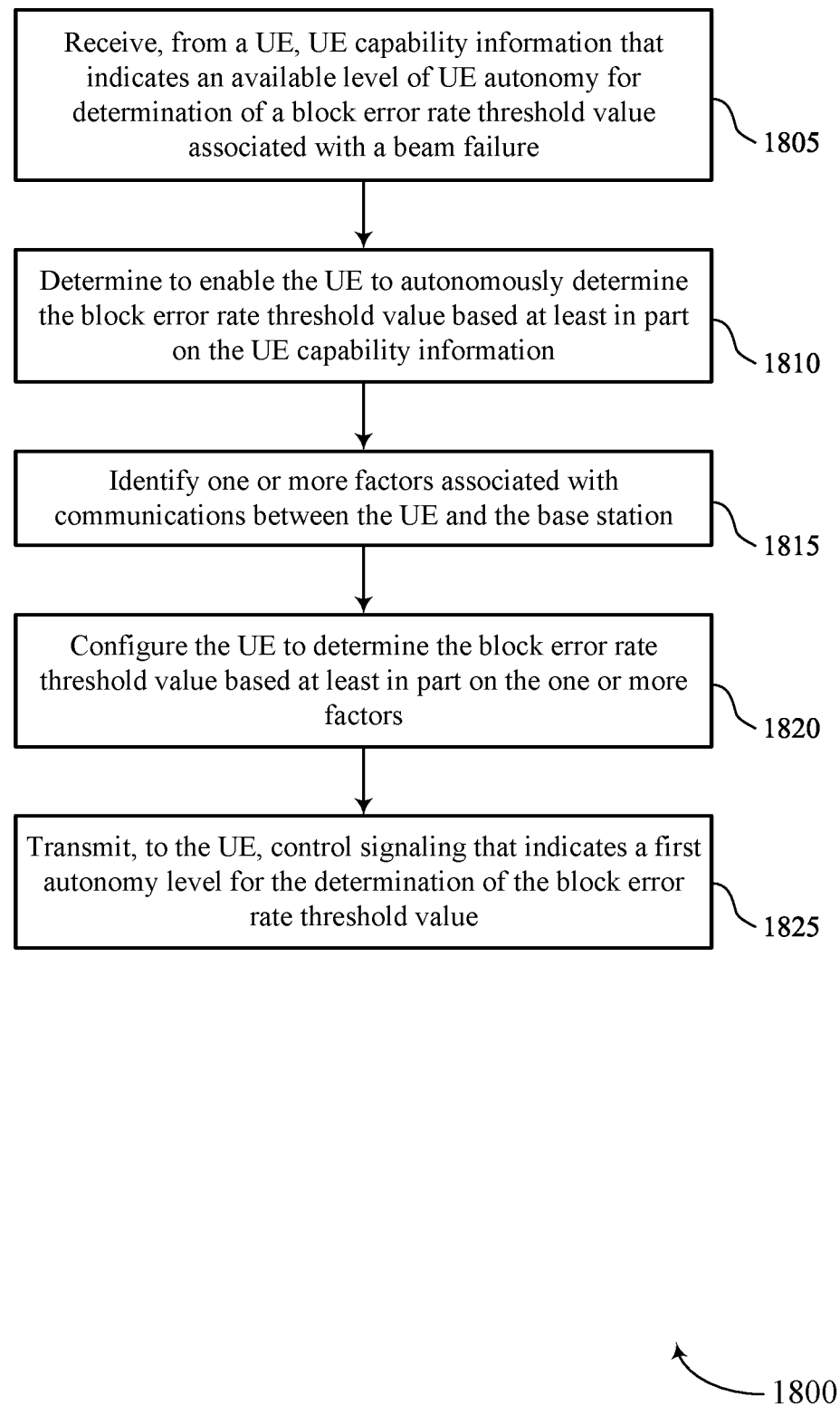

FIG. 18 shows a flowchart illustrating a method 1800 that supports beam failure indication techniques based on UE autonomy capability in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, UE capability information that indicates an available level of UE autonomy for determination of a BLER threshold value associated with a beam failure. The operations of 1805 may be performed in accordance with examples as disclosed herein. In some examples, aspects of the operations of 1805 may be performed by a UE capability manager 1125 as described with reference to FIG. 11.

At 1810, the method may include determining to enable the UE to autonomously determine the BLER threshold value based on the UE capability information. The operations of 1810 may be performed in accordance with examples as disclosed herein. In some examples, aspects of the operations of 1810 may be performed by a BLER threshold manager 1130 as described with reference to FIG. 11.

At 1815, the method may include identifying one or more factors associated with communications between the UE and the base station. The operations of 1815 may be performed in accordance with examples as disclosed herein. In some examples, aspects of the operations of 1815 may be performed by a BLER threshold manager 1130 as described with reference to FIG. 11.

At 1820, the method may include configuring the UE to determine the BLER threshold value based on the one or more factors. The operations of 1820 may be performed in accordance with examples as disclosed herein. In some examples, aspects of the operations of 1820 may be performed by a BLER threshold manager 1130 as described with reference to FIG. 11. In some cases, the one or more factors including one or more of an estimated interference associated with a channel between the UE and the base station, one or more prior BLER estimates, one or more QoS targets for communications between the UE and the base station, a number of beams available for communications between the UE and the base station, or any combinations thereof. In some cases, the one or more QoS targets including one or more of a target packet error rate for communications between the UE and the base station, a target latency for communications between the UE and the base station, a target data rate for communications between the UE and the base station, or any combinations thereof.

At 1825, the method may include transmitting, to the UE, control signaling that indicates a first autonomy level for the determination of the BLER threshold value. The operations of 1825 may be performed in accordance with examples as disclosed herein. In some examples, aspects of the operations of 1825 may be performed by a configuration manager 1135 as described with reference to FIG. 11.

Figure 19:
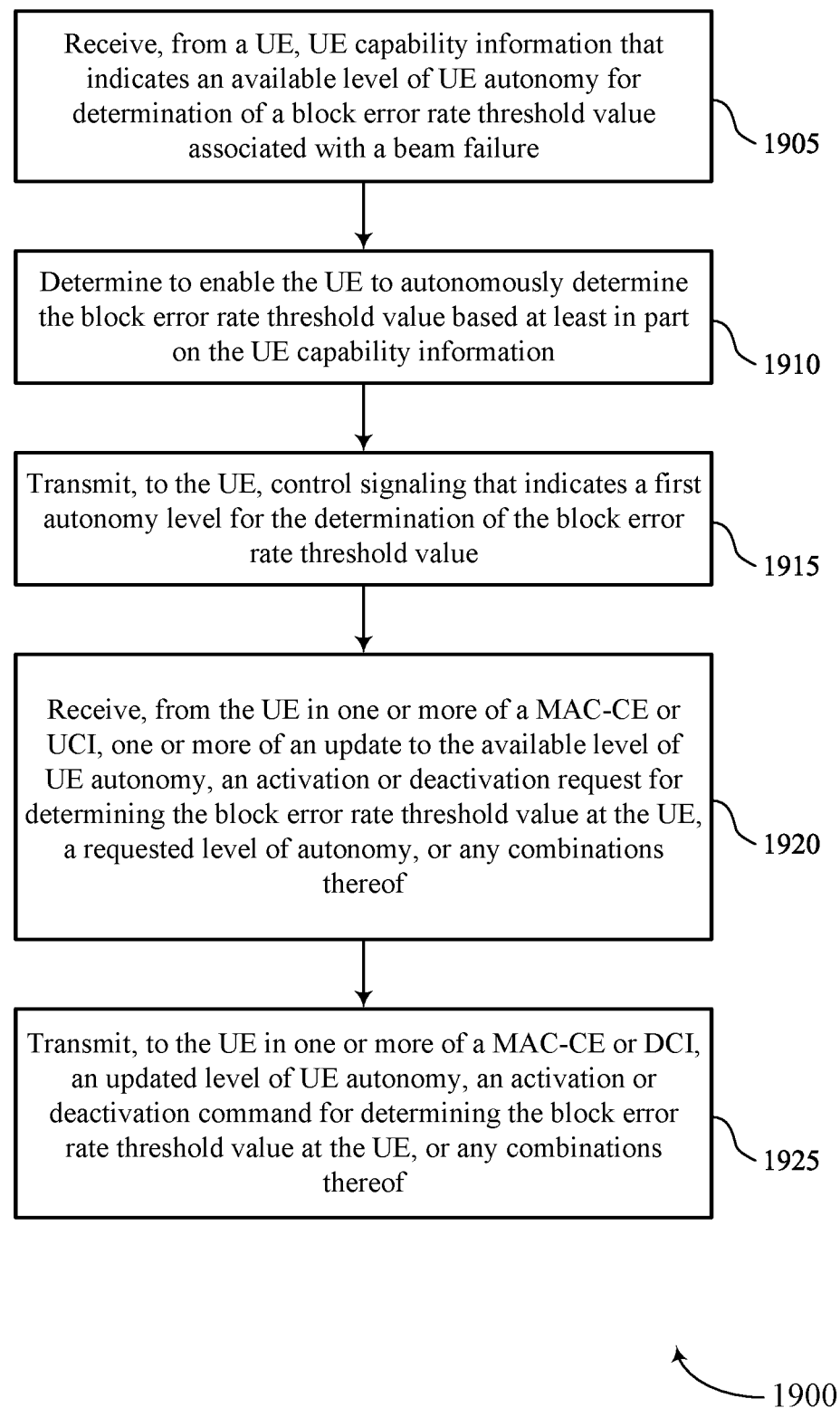

FIG. 19 shows a flowchart illustrating a method 1900 that supports beam failure indication techniques based on UE autonomy capability in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include receiving, from a UE, UE capability information that indicates an available level of UE autonomy for determination of a BLER threshold value associated with a beam failure. The operations of 1905 may be performed in accordance with examples as disclosed herein. In some examples, aspects of the operations of 1905 may be performed by a UE capability manager 1125 as described with reference to FIG. 11.

At 1910, the method may include determining to enable the UE to autonomously determine the BLER threshold value based on the UE capability information. The operations of 1910 may be performed in accordance with examples as disclosed herein. In some examples, aspects of the operations of 1910 may be performed by a BLER threshold manager 1130 as described with reference to FIG. 11.

At 1915, the method may include transmitting, to the UE, control signaling that indicates a first autonomy level for the determination of the BLER threshold value. The operations of 1915 may be performed in accordance with examples as disclosed herein. In some examples, aspects of the operations of 1915 may be performed by a configuration manager 1135 as described with reference to FIG. 11.

At 1920, the method may include receiving, from the UE in one or more of a MAC-CE or UCI, one or more of an update to the available level of UE autonomy, an activation or deactivation request for determining the BLER threshold value at the UE, a requested level of autonomy, or any combinations thereof. The operations of 1920 may be performed in accordance with examples as disclosed herein. In some examples, aspects of the operations of 1920 may be performed by a UE capability manager 1125 as described with reference to FIG. 11.

At 1925, the method may include transmitting, to the UE in one or more of a MAC-CE or DCI, an updated level of UE autonomy, an activation or deactivation command for determining the BLER threshold value at the UE, or any combinations thereof. The operations of 1925 may be performed in accordance with examples as disclosed herein. In some examples, aspects of the operations of 1925 may be performed by a configuration manager 1135 as described with reference to FIG. 11.

The following provides an overview of aspects of the present disclosure:

Aspect 1: A method for wireless communication at a UE, comprising: transmitting, to a base station, UE capability information that indicates an available level of UE autonomy for determination of a block error rate threshold value associated with a beam failure; receiving, from the base station, control signaling that indicates a first autonomy level from the available level of UE autonomy for the determination of the block error rate threshold value at the UE; determining the block error rate threshold value based at least in part on the first autonomy level at the UE; and determining whether a beam failure instance is detected based at least in part on the determined block error rate threshold value and an estimated block error rate for communications with the base station.

Aspect 2: The method of aspect 1, wherein the first autonomy level indicates that the UE is to determine the block error rate threshold value directly without constraints from the base station.

Aspect 3: The method of aspect 1, wherein the control signaling indicates the first autonomy level and one or more of a range of available block error rate threshold values or a set of available block error rate threshold values from which the UE may select the block error rate threshold value.

Aspect 4: The method of any of aspects 1 through 3, wherein the control signaling indicates the first autonomy level and one or more algorithms from a set of available algorithms to be used at the UE for the determining the block error rate threshold value.

Aspect 5: The method of any of aspects 1 through 4, wherein the control signaling is transmitted in RRC signaling, in a MAC-CE, in DCI, or any combinations thereof.

Aspect 6: The method of any of aspects 1 through 5, wherein the determining the block error rate threshold value comprises: selecting a block error rate threshold determination algorithm from a set of available algorithms at the UE; and determining the block error rate threshold value according to the selected block error rate threshold determination algorithm.

Aspect 7: The method of any of aspects 1 through 6, wherein the determining the block error rate threshold value comprises: identifying one or more factors associated with communications with the base station; and determining the block error rate threshold value based at least in part on the one or more factors.

Aspect 8: The method of aspect 7, wherein the one or more factors include one or more of an estimated interference associated with a channel between the UE and the base station, one or more prior block error rate estimates, one or more QoS targets for communications with the base station, a number of beams available for communications with the base station, or any combinations thereof.

Aspect 9: The method of aspect 8, wherein the one or more QoS targets include one or more of a target packet error rate for communications with the base station, a target latency for communications with the base station, a target data rate for communications with the base station, or any combinations thereof.

Aspect 10: The method of any of aspects 1 through 9, wherein the UE capability information includes one or more of an available machine learning capability of the UE, a processing power of the UE, an amount of memory at the UE, an amount of UE computation resources, or any combinations thereof.

Aspect 11: The method of any of aspects 1 through 10, further comprising: transmitting, to the base station in one or more of a MAC-CE or uplink control information, one or more of an update to the available level of UE autonomy, an activation or deactivation request for determining the block error rate threshold value at the UE, a requested level of autonomy, or any combinations thereof.

Aspect 12: The method of aspect 11, further comprising: receiving, from the base station in one or more of a MAC-CE or downlink control information, an updated level of UE autonomy, an activation or deactivation command for determining the block error rate threshold value at the UE, or any combinations thereof.

Aspect 13: The method of any of aspects 1 through 12, wherein the UE capability information and the control signaling are communicated using L3 signaling between the UE and the base station.

Aspect 14: The method of aspect 13, wherein one or more updated parameters associated with the first autonomy level are communicated using L1 or L2 signaling between the UE and the base station.

Aspect 15: A method for wireless communication at a base station, comprising: receiving, from a UE, UE capability information that indicates an available level of UE autonomy for determination of a block error rate threshold value associated with a beam failure; determining to enable the UE to autonomously determine the block error rate threshold value based at least in part on the UE capability information; and transmitting, to the UE, control signaling that indicates a first autonomy level for the determination of the block error rate threshold value.

Aspect 16: The method of aspect 15, wherein the first autonomy level indicates that the UE is to determine the block error rate threshold value directly without constraints from the base station.

Aspect 17: The method of aspect 15, wherein the control signaling indicates the first autonomy level and one or more of a range of available block error rate threshold values or a set of available block error rate threshold values from which the UE may select the block error rate threshold value.

Aspect 18: The method of any of aspects 15 through 17, wherein the control signaling indicates the first autonomy level and one or more algorithms from a set of available algorithms to be used at the UE for the determining the block error rate threshold value.

Aspect 19: The method of any of aspects 15 through 18, wherein the control signaling is transmitted in RRC signaling, in a MAC-CE, in DCI, or any combinations thereof.

Aspect 20: The method of any of aspects 15 through 19, further comprising: identifying one or more factors associated with communications between the UE and the base station; and configuring the UE to determine the block error rate threshold value based at least in part on the one or more factors.

Aspect 21: The method of aspect 20, wherein the one or more factors include one or more of an estimated interference associated with a channel between the UE and the base station, one or more prior block error rate estimates, one or more QoS targets for communications between the UE and the base station, a number of beams available for communications between the UE and the base station, or any combinations thereof.

Aspect 22: The method of aspect 21, wherein the one or more QoS targets include one or more of a target packet error rate for communications between the UE and the base station, a target latency for communications between the UE and the base station, a target data rate for communications between the UE and the base station, or any combinations thereof.

Aspect 23: The method of any of aspects 15 through 22, wherein the UE capability information includes one or more of an available machine learning capability of the UE, a processing power of the UE, an amount of memory at the UE, an amount of UE computation resources, or any combinations thereof.

Aspect 24: The method of any of aspects 15 through 23, further comprising: receiving, from the UE in one or more of a MAC-CE or uplink control information, one or more of an update to the available level of UE autonomy, an activation or deactivation request for determining the block error rate threshold value at the UE, a requested level of autonomy, or any combinations thereof.

Aspect 25: The method of aspect 24, further comprising: transmitting, to the UE in one or more of a MAC-CE or downlink control information, an updated level of UE autonomy, an activation or deactivation command for determining the block error rate threshold value at the UE, or any combinations thereof.

Aspect 26: An apparatus for wireless communication at a UE, comprising a processor; memory coupled with the processor; and instructions stored in the memory and executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at a base station, comprising a processor; memory coupled with the processor; and instructions stored in the memory and executable by the processor to cause the apparatus to perform a method of any of aspects 15 through 25.

Aspect 30: An apparatus for wireless communication at a base station, comprising at least one means for performing a method of any of aspects 15 through 25.

Aspect 31: A non-transitory computer-readable medium storing code for wireless communication at a base station, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting UE capability information that indicates one or more available levels of UE autonomy for determination, at the UE based at least in part on a UE measurement of a channel condition, of a block error rate threshold value associated with a beam failure;
    receiving, from an access network entity, control signaling that indicates a first autonomy level from the one or more available levels of UE autonomy and one or more of a range of available block error rate threshold values or a set of available block error rate threshold values from which the UE is configured to select the block error rate threshold value;
    determining, from the range of available block error rate threshold values or the set of available block error rate threshold values indicated via the control signaling, the block error rate threshold value based at least in part on the first autonomy level at the UE and a measured channel condition at the UE; and
    determining whether a beam failure instance is detected based at least in part on the determined block error rate threshold value and an estimated block error rate for communications with the access network entity.

2. The method of claim 1, wherein the control signaling indicates one or more algorithms from a set of available algorithms to be used at the UE for the determining the block error rate threshold value.

3. The method of claim 1, wherein the control signaling is transmitted in radio resource control (RRC) signaling, in a medium access control (MAC) control element, in downlink control information (DCI), or any combinations thereof.

4. The method of claim 1, wherein the determining the block error rate threshold value comprises:
    selecting a block error rate threshold determination algorithm from a set of available algorithms at the UE; and
    determining the block error rate threshold value according to the selected block error rate threshold determination algorithm.

5. The method of claim 1, wherein the determining the block error rate threshold value comprises:
    identifying one or more factors associated with communications with the access network entity; and
    determining the block error rate threshold value based at least in part on the one or more factors.

6. The method of claim 5, wherein the one or more factors include one or more of an estimated interference associated with a channel between the UE and the access network entity, one or more prior block error rate estimates, one or more quality of service (QOS) targets for communications with the access network entity, a number of beams available for communications with the access network entity, or any combinations thereof.

7. The method of claim 6, wherein the one or more QOS targets include one or more of a target packet error rate for communications with the access network entity, a target latency for communications with the access network entity, a target data rate for communications with the access network entity, or any combinations thereof.

8. The method of claim 1, wherein the UE capability information includes one or more of an available machine learning capability of the UE, a processing power of the UE, an amount of memory at the UE, an amount of UE computation resources, or any combinations thereof.

9. The method of claim 1, further comprising:
transmitting, in one or more of a medium access control (MAC) control element or uplink control information, one or more of an update to the one or more available levels of UE autonomy, an activation or deactivation request for determining the block error rate threshold value at the UE, a requested level of autonomy, or any combinations thereof.

10. The method of claim 9, further comprising:
receiving, in one or more of a MAC control element or downlink control information, an updated level of UE autonomy, an activation or deactivation command for determining the block error rate threshold value at the UE, or any combinations thereof.

11. The method of claim 1, wherein the UE capability information and the control signaling are communicated using layer three (L3) signaling between the UE and the access network entity.

12. The method of claim 11, wherein one or more updated parameters associated with the first autonomy level are communicated using layer one (L1) or layer two (L2) signaling between the UE and the access network entity.

13. A method for wireless communication at an access network entity, comprising:
receiving, from a user equipment (UE), UE capability information that indicates one or more available levels of UE autonomy for determination, at the UE based at least in part on a UE measurement of a channel condition, of a block error rate threshold value associated with a beam failure;
determining to enable the UE to autonomously determine the block error rate threshold value based at least in part on the UE capability information; and
transmitting, to the UE, control signaling that indicates a first autonomy level from the one or more available levels of UE autonomy and one or more of a range of available block error rate threshold values or a set of available block error rate threshold values from which the UE is configured to select the block error rate threshold value in accordance with the first autonomy level.

14. The method of claim 13, wherein the control signaling indicates one or more algorithms from a set of available algorithms to be used at the UE for the determining the block error rate threshold value.

15. The method of claim 13, wherein the control signaling is transmitted in radio resource control (RRC) signaling, in a medium access control (MAC) control element, in downlink control information (DCI), or any combinations thereof.

16. The method of claim 13, further comprising:
identifying one or more factors associated with communications between the UE and the access network entity; and
configuring the UE to determine the block error rate threshold value based at least in part on the one or more factors.

17. The method of claim 16, wherein the one or more factors include one or more of an estimated interference associated with a channel between the UE and the access network entity, one or more prior block error rate estimates, one or more quality of service (QOS) targets for communications between the UE and the access network entity, a number of beams available for communications between the UE and the access network entity, or any combinations thereof.

18. The method of claim 17, wherein the one or more QoS targets include one or more of a target packet error rate for communications between the UE and the access network entity, a target latency for communications between the UE and the access network entity, a target data rate for communications between the UE and the access network entity, or any combinations thereof.

19. The method of claim 13, wherein the UE capability information includes one or more of an available machine learning capability of the UE, a processing power of the UE, an amount of memory at the UE, an amount of UE computation resources, or any combinations thereof.

20. The method of claim 13, further comprising:
receiving, from the UE in one or more of a medium access control (MAC) control element or uplink control information, one or more of an update to the one or more available levels of UE autonomy, an activation or deactivation request for determining the block error rate threshold value at the UE, a requested level of autonomy, or any combinations thereof.

21. The method of claim 20, further comprising:
transmitting, to the UE in one or more of a MAC control element or downlink control information, an updated level of UE autonomy, an activation or deactivation command for determining the block error rate threshold value at the UE, or any combinations thereof.

22. An apparatus for wireless communication at a user equipment (UE), comprising:
a processor;
memory coupled with the processor; and
instructions stored in the memory and executable by the processor to cause the apparatus to:
transmit UE capability information that indicates one or more available levels of UE autonomy for determination, at the UE based at least in part on a UE measurement of a channel condition, of a block error rate threshold value associated with a beam failure;
receive, from an access network entity, control signaling that indicates a first autonomy level from the one or more available levels of UE autonomy and one or more of a range of available block error rate threshold values or a set of available block error rate threshold values from which the UE is configured to select the block error rate threshold value;
determine, from the range of available block error rate threshold values or the set of available block error rate threshold values indicated via the control signaling, the block error rate threshold value based at least in part on the first autonomy level at the UE and a measured channel condition at the UE; and
determine whether a beam failure instance is detected based at least in part on the determined block error rate threshold value and an estimated block error rate for communications with the access network entity.

23. The apparatus of claim 22, wherein the control signaling is transmitted in radio resource control (RRC) signaling, in a medium access control (MAC) control element, in downlink control information (DCI), or any combinations thereof.

24. The apparatus of claim 22, wherein the instructions to determine the block error rate threshold value are executable by the processor to cause the apparatus to:
select a block error rate threshold determination algorithm from a set of available algorithms at the UE; and
determine the block error rate threshold value according to the selected block error rate threshold determination algorithm.

25. An apparatus for wireless communication at an access network entity, comprising:
a processor;
memory coupled with the processor; and
instructions stored in the memory and executable by the processor to cause the apparatus to:
receive, from a user equipment (UE), UE capability information that indicates one or more available levels of UE autonomy for determination, at the UE based at least in part on a UE measurement of a channel condition, of a block error rate threshold value associated with a beam failure;
determine to enable the UE to autonomously determine the block error rate threshold value based at least in part on the UE capability information; and
transmit, to the UE, control signaling that indicates a first autonomy level from the one or more available levels of UE autonomy and one or more of a range of available block error rate threshold values or a set of available block error rate threshold values from which the UE is configured to select the block error rate threshold value in accordance with the first autonomy level.

26. The apparatus of claim 25, wherein the instructions are further executable by the processor to cause the apparatus to:
identify one or more factors associated with communications between the UE and the access network entity; and
configure the UE to determine the block error rate threshold value based at least in part on the one or more factors.

* * * * *